(12) United States Patent
De Jong et al.

(10) Patent No.: US 12,553,814 B2
(45) Date of Patent: Feb. 17, 2026

(54) BIOSENSOR USING PARTICLE MOTION

(71) Applicant: TECHNISCHE UNIVERSITEIT EINDHOVEN, Eindhoven (NL)

(72) Inventors: Arie Martin De Jong, Eindhoven (NL); Khulan Sergelen, Eindhoven (NL); Menno Willem Jose Prins, Eindhoven (NL); Yu-Ting Lin, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 505 days.

(21) Appl. No.: 18/022,350

(22) PCT Filed: Aug. 17, 2021

(86) PCT No.: PCT/NL2021/050510
§ 371 (c)(1),
(2) Date: Feb. 21, 2023

(87) PCT Pub. No.: WO2022/039594
PCT Pub. Date: Feb. 24, 2022

(65) Prior Publication Data
US 2024/0044770 A1 Feb. 8, 2024

(30) Foreign Application Priority Data
Aug. 21, 2020 (NL) ..................... 2026320

(51) Int. Cl.
*B01L 3/00* (2006.01)
*B01D 15/08* (2006.01)
(Continued)

(52) U.S. Cl.
CPC ......... *G01N 15/1429* (2013.01); *G01N 15/10* (2013.01); *A61M 2205/3303* (2013.01); *G01N 15/01* (2024.01)

(58) Field of Classification Search
CPC .... G01N 15/1429; G01N 15/10; G01N 15/01; G01N 15/1433; G01N 2015/1027;
(Continued)

(56) References Cited

U.S. PATENT DOCUMENTS

2004/0218798 A1 11/2004 Abdel-Fattah et al.
2011/0236262 A1 9/2011 Horii et al.
(Continued)

FOREIGN PATENT DOCUMENTS

CN 107110761 A 8/2017
CN 110824106 A 2/2020
(Continued)

OTHER PUBLICATIONS

Laurens et al., "Dissecting protein-induced DNA looping dynamics in real time", Nucleic Acids Research, 2009, vol. 37, No. 16, pp. 5454-5464.
(Continued)

*Primary Examiner* — Jennifer Wecker
*Assistant Examiner* — Oyeleye Alexander Alabi
(74) *Attorney, Agent, or Firm* — Myers Bigel, P.A.

(57) ABSTRACT

The present invention relates to a biosensor device for sensing an analyte over a period of time using particle motion, the biosensor device having a surface and a particle, wherein the particle and/or the surface are functionalized, and wherein the biosensor device has a first state in which the particle is associated with the surface and a second state in which the particle is not associated with the surface, and wherein switching between the first and second states depends on the presence, absence and/or concentration of the analyte, whereby motion characteristics of the particle change depending on the presence, absence and/or concentration of the analyte, thereby allowing sensing of the analyte by measuring changes in a spatial coordinate param-
(Continued)

eter of the particle relative to the surface, and wherein the properties of the particle and surface are selected such that in the second state the particle is within the vicinity of the surface such that the biosensor is able to measure changes in a spatial coordinate parameter of the particle relative to the surface, preferably wherein the distance between the particle and the surface in the second state is within the range of 5 nm to 10 μm and wherein the particle is not conjugated to the surface.

20 Claims, 14 Drawing Sheets

Specification includes a Sequence Listing.

(51) Int. Cl.
| | |
|---|---|
| B01F 33/302 | (2022.01) |
| B01F 33/3033 | (2022.01) |
| B01J 20/285 | (2006.01) |
| B01J 20/287 | (2006.01) |
| B01J 20/32 | (2006.01) |
| B01L 7/00 | (2006.01) |
| B01L 9/00 | (2006.01) |
| B65G 47/80 | (2006.01) |
| B82Y 20/00 | (2011.01) |
| B82Y 30/00 | (2011.01) |
| B82Y 40/00 | (2011.01) |
| C12M 1/34 | (2006.01) |
| C12M 3/06 | (2006.01) |
| C12N 1/14 | (2006.01) |
| C12N 1/20 | (2006.01) |
| C12Q 1/02 | (2006.01) |
| C12Q 1/6806 | (2018.01) |
| C12Q 1/6827 | (2018.01) |
| C12Q 1/6844 | (2018.01) |
| C12Q 1/6848 | (2018.01) |
| C12Q 1/686 | (2018.01) |
| G01N 15/01 | (2024.01) |
| G01N 15/10 | (2024.01) |
| G01N 15/14 | (2024.01) |
| G01N 15/1429 | (2024.01) |
| G01N 15/1433 | (2024.01) |
| G01N 21/29 | (2006.01) |
| G01N 21/33 | (2006.01) |
| G01N 21/64 | (2006.01) |
| G01N 21/65 | (2006.01) |
| G01N 21/76 | (2006.01) |
| G01N 30/02 | (2006.01) |
| G01N 30/60 | (2006.01) |
| G01N 30/72 | (2006.01) |
| G01N 33/00 | (2006.01) |
| G01N 33/50 | (2006.01) |
| G01N 33/543 | (2006.01) |
| G01N 33/557 | (2006.01) |
| G01N 33/574 | (2006.01) |
| G01N 33/58 | (2006.01) |
| G01N 33/68 | (2006.01) |
| G01N 35/00 | (2006.01) |
| H05B 45/10 | (2020.01) |

(58) Field of Classification Search
CPC ....... G01N 33/5438; G01N 2015/1006; G01N 33/54313; G01N 15/1031; A61M 2205/3303
See application file for complete search history.

(56) References Cited

U.S. PATENT DOCUMENTS

| | | |
|---|---|---|
| 2017/0315115 A1 | 11/2017 | Prins et al. |
| 2017/0362645 A1* | 12/2017 | Prins .................. C12Q 1/6825 |
| 2017/0370818 A1 | 12/2017 | Gazzola et al. |
| 2020/0049704 A1 | 2/2020 | Akama et al. |

FOREIGN PATENT DOCUMENTS

| | | |
|---|---|---|
| JP | 2013533469 A | 8/2013 |
| JP | 2018506709 A | 3/2018 |
| JP | 2020027032 A | 2/2020 |
| WO | 2011149526 A2 | 12/2011 |
| WO | 2016096901 A1 | 6/2016 |
| WO | 2016098011 A1 | 6/2016 |

OTHER PUBLICATIONS

Heo et al., "Towards Smart Tattoos: Implantable Biosensors for Continuous Glucose Monitoring", Adv. Healthcare Mater. 2013, 2, 43-56.
First Office Action with English language translation, CN Application No. 202180051285X, Aug. 8, 2025, 20 pp.
Notification of Reason(s) for Refusal with English language translation, JP Application No. 2023-512696, Jun. 3, 2025, 39 pp.
Masaike, et al., "Cooperative three-step motions in catalytic subunits of F1-ATPase correlate with 801 and 401 substep rotations", Nature Structural & Molecular Biology, vol. 15, Nov. 16, 2008, pp. 1326-1333.
International Search Report (ISR) for PCT/NL2021/050510 mailed Nov. 26, 2021 (6 pages).
Written Opinion of the International Search Authority (WO) for PCT/EP2021/050510 mailed Nov. 26, 2021 (11 pages).
Anonymous. "Conjugated system—Wikipedia", dated Aug. 2, 2021, pp. 1-11. Retrieved from the Internet: URL:https://en.wikipedia.org/wiki/Conjugated_system, XP055860828, retrieved on Nov. 12, 2021.
Anonymous. "Multiplexing—Wikipedia", dated Aug. 19, 2021, pp. 1-8. Retrieved from the Internet: URL: https://en.wikipedia.org/wiki/Multiplexing, XP055860965, retreived on 2021 Nov. 2021.
Laurens et al., "Dissecting protein-induced DNA looping dynamics in real time", Nucleic Acids Research, 2009, Vo 37, No. 16, pp. 5454-5464.

* cited by examiner

BIOSENSOR USING PARTICLE MOTION

REFERENCE TO AN ELECTRONIC SEQUENCE LISTING

The contents of the electronic sequence listing (i.e., 3841-155US_ST25.txt; Size: 1 KB; and Date of Creation: Oct. 23, 2023) is herein incorporated by reference in its entirety.

TECHNICAL FIELD

The present invention relates to a biosensor device for sensing an analyte over a period of time using particle motion. The present invention further relates to a method for sensing an analyte using particle motion, use of the biosensor device of the present invention in a method for sensing an analyte or as a sensor on, in or as part of another device. The present invention further relates to the biosensor device of the present invention for use in in vivo biosensing, ex vivo biosensing, or in vitro biosensing.

BACKGROUND

Biosensor devices for chemical or biochemical markers have typically been developed for use in in vitro diagnostics, where a sample is taken (e.g. blood, saliva, urine, mucus, sweat or cerebrospinal fluid) and is transferred to an artificial device (e.g. a plastic disposable) outside a living organism. In such biosensing assays, a wide range of sample pre-treatment steps can be applied (e.g. separation or dilution steps) and multiple reagents can be introduced in the assay (e.g. for target amplification, signal amplification, or washing steps). Examples of in vitro biosensing assays are: immunoassays, nucleic acid tests, tests for electrolytes and metabolites, electrochemical assays, enzyme activity assays, cell-based assays, and the like. For a complete overview reference is made to *Tietz textbook of clinical chemistry and molecular diagnostics* (Connell, 2012, 5th edition).

In in vivo biochemical sensing, at least a part of the sensor system remains connected to or is inserted in a living organism, e.g. a human body, e.g. on the skin, in the skin, below the skin, or on, in, or below another part of the body. Due to the contact between the biosensor and the living organism, in vivo biochemical sensing sets high requirements on biocompatibility (e.g. inflammation processes should be minimized) and the sensor system should operate reliably within the complex environment of the living organism. For monitoring applications, the system should be able to perform more than one measurement over time and the system should be robust and easy to handle.

A known application of in vivo biochemical sensing is continuous glucose monitoring (CGM). Commercial continuous glucose monitoring devices are based on enzymatic electrochemical sensing (see for example: Heo, Yun Jung, and Shoji Takeuchi; *Towards smart tattoos: implantable biosensors for continuous glucose monitoring*; Advanced healthcare materials 2(1), 2013: pp. 43-56). Enzymatic sensing is less generic than affinity-based sensing. Commercial systems for in vivo glucose monitoring are available from e.g. Dexcom and Medtronic.

There are many applications in the field of sensing and monitoring. Biological systems such as cells, multi-cellular systems, organs, organisms, or other systems and materials based on biological molecules or containing biological molecules or cells, exhibit dynamics that are at the most basic level driven by time-dependent changes of bioorganic molecules, such as e.g. small molecules, metabolites, hormones, proteins, or nucleic acids. For several applications, it would be highly valuable to be able to monitor specific molecules that critically reflect the dynamics, so that timely actions can be taken and changes can be managed. Sensing technologies for the measurement and monitoring of biomolecules will allow studies of dynamic changes in biological systems and control of such systems based on measured responses, e.g. in the fields of healthcare, bio-engineering, and industrial processing. Sensors are available for continuously measuring pH, electrolytes, and metabolites, but not yet for measuring biomolecules at low concentrations.

A known technique for measuring biomolecules and biomolecular interactions is tethered particle motion (TPM). The TPM technique is based on measurements of the motion of particles tethered to a surface. An example of such system is described by Laurens et al. (*Dissecting protein-induced DNA looping dynamics in real time*; Nucleic acids research 37(16), 2009: pp. 5454-5464), where TPM experiments are reported on proteins that bind to a DNA tether, in order to reveal how the proteins change the DNA conformation. In such studies, measures are taken to avoid not-via-the-tether binding of the particle to the surface, because a particle that is bound to the surface in another way than via the tether, does not give information about the tether.

Biosensors having functionalized tethers attached to a surface have been developed based on the principle that the motion of particles attached by a tether changes in dependence upon presence of analyte. The motion changes are due to changes in the structure of the tether itself due to the presence of the analyte. There are also techniques for detecting analytes by measuring a kinematic property of a functionalized particle tethered to a surface in dependence upon presence of analyte. In these techniques, it is important to avoid particle bonding to the surface, because the steric hindrance interferes with sensitivity influenced by the analyte.

Even further biosensors based on the TPM technique having functionalized particles and/or functionalized surfaces have been described in, for example, International patent application published under number WO 2016/096901 A1.

DESCRIPTION

Given the biosensors described in the art, the inventors developed a novel biosensor device suitable for the continuously, repeatedly or intermittently sensing of an analyte over a period of time using particle motion. The invention provides hereto a biosensor device having a surface and a particle, wherein the particle and/or the surface are functionalized, and wherein:
  the biosensor device has a first state in which the particle is associated with the surface and a second state in which the particle is not associated with the surface; and
  switching between the first and second states depends on the presence, absence and/or concentration of the analyte,
  whereby motion characteristics of the particle are changeable depending on the presence, absence and/or concentration of the analyte, thereby allowing sensing of the analyte by measuring changes in a spatial coordinate parameter of the particle relative to the surface. It was found that in case the properties of the particle and surface are selected such that in the second state the particle is within the vicinity of the surface such that the biosensor is able to measure changes in a spatial coordinate parameter of the particle relative to the surface. The phrase 'in vicinity of the surface' may refer to a distance between the particle and the surface in the second state wherein the biosensor is still able to measure changes in a spatial coordinate parameter of the particle relative to the surface. It is noted that such distance between the particle and the surface is not restricted to any distance, it is noted that a greater distance between the particle and the surface results in a less efficient biosensor compared to a biosensor wherein the distance between the particle and the surface is smaller. Preferably, the distance between the particle and the surface in the second state is at least 5 nm, more preferably within the range of 5 nm to 100 µm, more preferably within the range of 5 nm to 10 µm. It was found that there is no further need to conjugate the particle to the surface. In other words, the present invention provides a non-tethered biosensor device which is suitable for use in a method for the continuous sensing of an analyte.

It was found that, although the particles are not linked to the surface, e.g. using a tether-linker, the biosensor device of the present invention enables continuous molecular biosensing without a fixed tether between the particle and the surface. I.e. the particle remains in proximity of a surface, e.g. due to a field force, e.g. due to the gravitational field. The particles of the biosensor device of the present invention show Brownian motion and the motion changes when the particle switches between an associated and a non-associated state (also referred to as the 'dissociated state'). The motion behaviour and association/dissociated state lifetimes of the particle depend on the concentration of target, i.e. the analyte, in the solution.

As used herein, the term 'conjugated' refers to the covalent attachment of a first molecule to a second molecule. Also, the term 'conjugated' refers to the linking of one part of the biosensor device with another part of the biosensor device, e.g. crosslinking the particle of the biosensor device with the surface of the biosensor device via, for example, a linker or tether. As used herein the phrase 'the particle is not conjugated to the surface' refers, in a non-associated state, to a freely movable particle that is not linked to the surface.

As used herein, the term 'biosensing' refers to the identification, testing, characterisation, monitoring, and otherwise measuring an analyte using a biosensor.

As used herein, the term 'analyte' refers to a substance being identified, tested, characterized, monitored, or otherwise measured; the analyte can comprise molecules of a single target species (e.g., glucose), or molecules of multiple target species (e.g., glucose and synthetic deoxyribose nucleic acid (DNA)). Examples of analyte include latex beads, lipid vesicles, whole chromosomes, nanoparticles, extracellular vesicles, liposomes, viruses, cells, cell fragments, supramolecular objects, protein aggregates, and biomolecules including proteins and nucleic acids, gaseous molecules (e.g., ethylene), metal or semiconductor colloids and clusters, small molecules in the size range of subnanometre to 10 nm, metabolites, and other such chemical molecules.

As used herein, the term 'particle' can refer to an object with a detectable motion in a fluidic or viscoelastic matrix. A fluidic or viscoelastic matrix is often simply referred to as a fluid. The particle can consist of e.g. organic material (e.g., polymer, supramolecular system, micelle, nanosome), inorganic material (e.g., oxide, silica, metal), or combinations thereof. It can have different inner and outer shapes and architectures (e.g. spherical, rod-like, hollow, star, bubble, hybrid system, particles inside a matrix, aggregate, regular or irregular). It can have a short axis in the range between 1 nm and 15 µm, more preferred between 5 nm and 5 µm, more preferred between 10 nm and 3 µm.

As used herein, the term 'surface' can refer to an object with respect to which a coordinate parameter of a particle can be measured, e.g. a position, a distance, a translation, a displacement, an angle, an orientation, a rotation, a translational or angular velocity. A surface can consist of e.g. organic material or inorganic material, or a combination thereof. It can have different shapes (e.g. flat, curved, corrugated) and different inner and outer architectures (e.g. solid, porous, permeable, layered, flexible, viscoelastic).

Regarding the surface suitable for use in the present invention, it is noted that the surface may be a supporting structure, such as a planar surface, a surface with concave or convex structure, a chemically and/or physically patterned surface, a particle, a polymer, a porous structure, or a porous matrix. It is emphasized that the surface may also be a three dimensional structure.

As used herein, the phrase 'properties of the particle and surface' refer to the parameters of the particle, surface and fluid causing the particle to have a distance between the particle and the surface in the second state being e.g. within the range of 5 nm to 10 µm. For example, particle parameters relevant for providing a biosensor of the present invention may include the size of the particle and density of the particle. For example, surface parameters may be a selection of surface material or type of material or design having acoustic or magnetic or transport or mechanical properties or the like. Also the phrase 'properties of the particle and surface' includes the cooperation between the particle, the surface, and the fluid, i.e. the method to confine the particle to the surface, e.g. by weight, by acoustic field, by flow, by mechanical confinement, or the like, and corresponding properties such as density, temperature, applied filed, mechanical design, and the like.

As used herein, the term 'biosensor' can refer to any suitable sensor used in biochemical testing, biological testing, chemical testing, electrochemical testing, and the like.

As used herein, the phrase 'associated with the surface' refers to a binding or an attachment that is non-covalent and means that the particle of the present invention adheres to, is bonded to, or is electrostatically attached to the surface of the biosensor device, for example.

The biosensor device of the present invention may contain various amounts of particles. However, preferably the biosensor device of the present invention may comprise at least 10 particles, more preferred at least 100 particles. It was found that by providing a biosensor device comprising more than 10 particles, more preferred more than 100 particles, a robust and reliable biosensing method can be performed. It was further found that the biosensor device may comprise a density of between a few particles to several thousand particles in a 415×415 µm$^2$ region. Preferably, the biosensor device may comprise a particle density of between 100 and 100,000 particles in a 415×415 µm$^2$ region, more preferably between 500 and 20,000 particles, even more preferably between 1,000 and 10,000 particles in a 415×415 µm$^2$ region. The total area where particles are tracked is preferably between $10^0$ and $10^8$ µm$^2$, more preferred between $10^3$ and $10^7$ µm$^2$, more preferred between $10^4$ and $10^6$ µm$^2$.

In order to sense the analyte, the biosensor device may comprise an optical system having a diffraction limit, wherein the biosensor device comprises particles separated from nearest-neighbour particles by at least the diffraction limit of the optical system.

The biosensor device of the present invention may implement a binding assay, a competitive assay, a displacement assay, a sandwich assay, an enzymatic assay, an assay with target and/or signal amplification, a multistep assay, or an assay with molecular cascade.

As used herein, the term 'functionalized' refers to the state wherein the inert particle and/or inert surface have been transformed into a particle and/or surface having a certain activity. In particular, the particle and/or the surface may be functionalized with binding sites or binding moieties, such as antibodies, aptamers, nanobodies, molecularly imprinted polymers, organic molecules, and the like.

The particle of the biosensor device may be functionalized by a first moiety, wherein the first moiety is bound to the particle. Instead of having a functionalized particle, the biosensor device may comprise a functionalized surface that is functionalized by a second moiety, wherein the second moiety is bound to the surface. In case the a first or second moiety is used, wherein either the particle is functionalized or the surface is functionalized, the moieties used have a binding affinity to the analyte. By providing such system, the steric hindrance of the presence of the analyte causes the particle to move to the second state (i.e. the particle-surface non-associated state), whereas the absence of the analyte, and thus the absence of any steric hindrance, causes the particle to move to the particle-surface associated state (i.e. the first state of the present invention).

As used herein, the term 'bound' refers to a binding or an attachment that may be covalent, e.g. by chemically coupling, or non-covalent, e.g. by ionic interactions, hydrophobic interactions, hydrogen bonds, etc. Covalent bonds can be, for example, ester, ether, phosphoester, amide, peptide, imide, carbon-sulfur bonds, carbon-phosphorus bonds, and the like. The term 'bound' is broader than and includes terms such as 'coupled', 'fused', 'associated', 'linked' and 'attached'.

Alternatively, both the particle and the surface may be functionalized, i.e. providing a biosensor device of the present invention wherein the particle is functionalized by the first moiety, wherein the first moiety is bound to the particle and wherein the surface is functionalized by the second moiety, wherein the second moiety is bound to the surface. In such configuration of the biosensor device of the present invention, both moieties preferably have a binding affinity to each other in dependence on the presence, absence or concentration of the analyte. On the one hand, such biosensor device may provide an analyte biosensing method wherein in the presence of the analyte the functionalized particle is in its first state, i.e. associated with the functionalized surface. On the other hand, such biosensor device may provide an analyte biosensing method wherein in the absence of the analyte the functionalized particle is in its first state, i.e. associated with the functionalized surface.

With regard to the density of the moieties bound to the particle or to the surface, it is submitted that any density may be suitable for providing a biosensor device suitable for use in a method of biosensing an analyte. Such surface density may preferably between $10^0$ and $10^8$ moieties/$\mu m^2$. Preferably, the biosensor device may have a density of moieties in the range between $10^1$ and $10^7$ moieties/$\mu m^2$, preferably wherein the moieties bound to the particle or to the surface have a density in the range between $10^1$ and $10^7$ moieties/$\mu m^2$, $10^2$ and $10^6$ moieties/$\mu m^2$ or $10^3$ and $10^5$ moieties/$\mu m^2$.

The first moiety or the second moiety may be selected from the group consisting of a protein, an antibody, a fragment thereof, a recombinant protein, a peptide, a carbohydrate, a saccharide, a molecularly imprinted polymer, a small molecule, a nucleic acid, a DNA molecule, a PNA molecule, an aptamer, a nanobody, a multivalent binder, or a combination thereof. Preferably, the first moiety or the second moiety is selected from the group consisting of a binding molecule for glucose, electrolyte, metabolite, small molecule, bioactive, toxin, lipid, carbohydrate, peptide, hormone, drug, drug metabolite, protein, oligonucleotide, DNA, RNA, nanoparticle, extracellular vesicle, exosome, nanosome, liposome, viral particle, cell, cell fragment, supramolecular object, or protein aggregate.

In a further aspect of the present invention, the invention relates to the use of the biosensor device according to the present invention in a method of performing multiplexing, preferably analyte multiplexing, spatial multiplexing (e.g. spot multiplexing or chamber multiplexing), spectroscopic multiplexing, probe functionality multiplexing. Even further, the present invention relates to the use of the biosensor device according to the present invention as a sensor on, in or as part of a system for sensing or monitoring, which may include e.g. an endoscope, a tube, a needle, a fiber, a catheter, a patch, a disposable probe, a wearable device, an insidable device, a flow cell, or a disposable cartridge.

In another aspect of the present invention, the invention relates to a biosensor device according to the present invention for use in in vivo biosensing, ex vivo biosensing, or in vitro biosensing, such as in in vitro diagnostic testing, point-of-care testing, environmental testing, food testing, process monitoring, process control, forensics, biological, biomedical, and pharmaceutical research, or to monitor assays with live cells, tissue, or an organ.

In yet another aspect of the present invention, the invention relates to a method for sensing an analyte using particle motion, wherein the method comprises the steps of:
  a) contacting a matrix containing the analyte with the biosensor device of the present invention; and
  b) detecting motion characteristics of the particle that change depending on a presence of the analyte, wherein the motion characteristics comprise a spatial coordinate parameter of the particle relative to the surface.

Given the method of the present invention, it is noted that the particle of the biosensor device of the present invention is typically arranged to switch from the first state (i.e. the particle-surface associated state) to the second state (i.e. the particle-surface non-associated state) with an average effective dissociation time. Also the particle of the biosensor device of the present invention is typically arranged to switch from the second state to the first state with an average effective association time.

Furthermore, it was found that by controlling the flow of the matrix containing the analyte, the net distances that particles can be displaced throughout the biosensor is minimized. Therefore, method of the present invention may further includes the step wherein in step b) the direction of the flow of the matrix containing the analyte is continuously or intermittently changed. Such change of flow may be subjected to a random flow directional change or to a reversal flow direction change.

As used herein, the terms 'average effective dissociation time' and 'average effective association time' refer to the average time needed for the particles to, respectively, dissociate from the surface and associate with the surface. In other words, the average time needed to, respectively, reach the fully particle-surface non-associated state (i.e. the second state) and the particle-surface associated state (i.e. the first state), i.e. any type of associated state, e.g. with a single-molecule bond (monovalent) or with multiple molecular bonds (multivalent).

In view of the average effective dissociation and association time of the particle to reach a bounded or unbounded state with the surface, in a preferred embodiment of the method of the present invention step b) of detecting motion characteristics of the particle is performed over a period of time that is longer than the average effective dissociation time and/or the average effective association time. By providing a method wherein the detecting of motion characteristics of the particle is performed over a period of time that is longer than the average effective dissociation time and/or the average effective association time, a robust and reliable method is provided wherein events with regard to the sensing of the analyte can be sufficiently measured, for achieving good analyte sensing event statistics or for extraction of state lifetimes and state lifetime distributions.

The invention describes a biosensor with single-molecule resolution. Sensors with single-molecule resolution give signals with digital characteristics, also referred to as levels, states, transitions, switches, or events. Such digital signals obey the fundamental laws of Poisson statistics. It means for example that the coefficient of variation due to stochastics can scale with 1/square-root(N), with N the average number of detected events. Therefore, improving the statistics of detected events, reduces variation and increases precision.

In state of the art sensors, low concentrations are typically measured by using binding moieties with a high affinity and/or with low dissociation rate constant (low k_off). A low dissociation rate constant means slow unbinding characteristics (long bound state lifetime of the analyte), which would not be beneficial if it determines the statistics of binding events of the particles. To achieve good statistics (high number of detected particle events N), particle state lifetimes should not be too long, otherwise insufficient events are recorded in a given measurement timespan.

In one aspect of the invention, the statistics can be improved by having one binding with relatively low dissociation rate constant (to be able to measure low concentrations), and another binding with relatively high dissociation rate constant (for high N, i.e. good particle event statistics). When the dissociation rate constants differ by a factor of about 3, then the dissociation of an analyte from the strongest binder (with the lowest dissociation rate constant) takes on average three times as long as the dissociation from the weakest binder (with the highest dissociation rate constant). Due to this time ratio, several particle binding and unbinding events may be observed during the time when the analyte is associated with the strongest binder (e.g. in a sandwich assay), or several particle binding and unbinding events may be suppressed during the time when the analyte is associated with the strongest binder (e.g. in a competition assay). Assuming for example 3 unbinding and 3 binding events, then effectively N=6; this would give a potential reduction of the coefficient of variation by a factor 1/square-root(6), which is significantly lower than 1. Therefore, the variation is significantly lower and the measurement is more precise due to the ratio between dissociation rate constants.

EXAMPLES

Defining the Particle Size

The diffusivity of an unbound spherical particle with radius R is given by the Stokes-Einstein relation:

$$D = \frac{k_b T}{6\pi\eta R} \quad (1)$$

where $\eta$ is the viscosity of the solution. Given the Stokes-Einstein relation it is noted that a small particle has a higher diffusivity than a large particle. A high diffusivity is advantageous for the rate of collision or encountering between particle and surface.

However, it is further noted that it is more difficult to precisely track a small particle than a large particle, because a small particle diffuses faster. Furthermore, the optical signal of a small particle is lower than of a large particle, because a large particle gives more signal, e.g. a large particle scatters or generates more photons.

The distance between particle and surface in the biosensor of the present invention can depend on the size of the particle.

It was assumed that the particle is attracted toward the surface by a force F. The force can be time and spatially dependent; however, here the force was assumed to be constant (for simplicity reasons). Here it is assumed that thermal energy causes every particle to be distributed over different particle positions. Due to thermal energy, the particle has a probability distribution in the near-surface region, with a characteristic decay length (which can be viewed in similarity to a barometric height):

$$h_b = \frac{k_b T}{F} \quad (2)$$

where $k_b$ is the Boltzmann constant, and T is the temperature. The force F can have several origins (e.g. gravitational, acoustic, magnetic, optical, electrical, fluid mechanical) and can depend on the size of the particle.

In case of a gravitational force, the characteristic decay length of a particle is given by the buoyancy force. A spherical particle was assumed (for simplicity reasons) with radius R and an effective mass density difference between particle and solution $\Delta\rho$. Then:

$$h_b = \frac{k_b T}{\frac{4}{3}\pi R^3 \Delta\rho g} \quad (3)$$

where g is the acceleration of gravity. To see the scaling behaviour, a value for $\Delta\rho$ of $0.8 \cdot 10^3$ kg/m³ and T=293 K was assumed (for simplicity reasons), and then the $h_b$ was calculated for different values of particle radius, resulting in the following list of values:

R=0.1 µm gives $h_b$=122 µm;
R=0.5 µm gives $h_b$=0.98 µm; and
R=1.4 µm gives $h_b$=45 nm.

Equation 3 shows that the height spread of small particles is much larger than the height spread of large particles. A large height spread gives a large average distance between particle and surface, which is disadvantageous for the collision rate or encounter rate between particle and surface, hence hindering the effective association rate between particle and surface.

It is noted that the mass density difference $\Delta\rho$ can be positive (i.e. the particle is heavier than the solution; the particle 'sinks' toward the biosensing surface) or negative (i.e. the particle is lighter than the solution; the particle 'floats' toward the biosensing surface).

Alternatively or additionally, the particle may be kept in close vicinity to the surface by a mechanical means, e.g. by a second surface that restricts the height space where the particle can reside, or which limits the accessible distance range between particle and first surface. It can function as a means to keep the particle in proximity of the first surface and hinder the particle from moving away too far from the first surface.

In another aspect, the second surface may be porous, so that analyte and/or fluid can penetrate into the second surface or permeate through the second surface into and/or out of the region with the particle.

In another aspect, the first surface may be porous, so that analyte and/or fluid can penetrate into the first surface or permeate through the first surface into and/or out of the region with the particle.

A large particle can give a small height spread and small effective distances between particle and surface (see above). However, a small height spread and small effective distances can also hinder the reversibility of biomolecular interactions, giving low dissociation rates. Large particles can give steric hindrance, slowing down association and dissociation processes, i.e. the switching of the biosensor device system of the present invention from its first state to its second state and vice versa. Furthermore, large particles can give non-specific interactions between particle and surface including irreversible sticking, even if blocking and anti-fouling coatings are applied on particle and surface.

Biosensor Devices Using Particles with a Diameter of 1 µm

Biosensor devices were prepared comprising particles with a diameter of either 1 µm or 2.8 µm. Two types of biosensor devices were prepared by using streptavidin coated 1 µm particles (Dynabeads MyOne C1) where 10 µM particle binder biotin-oligo (SEQ ID NO: 1) was coupled via streptavidin to the particle. The remaining part of the particle was blocked using 100 µM 1 kDa PEG-biotin and 1% BSA.

The surface (biosensor device A) was prepared by using a glass substrate comprising 100 µg/mL neutravidin (physisorption), 500 nM surface biotin-oligo (SEQ ID NO: 4) coupled via neutravidin to the surface and using a detection oligo molecule (SEQ ID NO: 3) coupled via the biotin-oligo to the surface. The remaining part of the surface was blocked using 100 µM 1 kDa PEG-biotin and 1% BSA.

Alternatively, another surface (biosensor device B) was prepared by using PLL-g-PEG and click-coupled biotin-oligo on a glass substrate.

Flow cell cartridges with measurement chambers were constructed using a double-side adhesive layer and a top plate with fluid inlet and outlet. Data were collected by replacing fluid in a flow cell, i.e. by consecutively inserting solutions with different analyte concentrations. The fluid was inserted manually, using a pipette. The flow speeds in the experiments were typically on the order of 1-300 microliters per minute.

As a target, an analyte having SEQ ID NO: 2 was used.

TABLE 1

Synthetic DNA sequences used

| SEQ ID | Description | Sequence |
|---|---|---|
| NO: 1 | Particle binder | biotin-3' AGCATGGCACT 5' |
| NO: 2 | Analyte | 5' TCGTACCGTGAGTAATAATGCG 3' |
| NO: 3 | Detecting | 3' CATTATTACAAGCTAAGCTCTTGCACTGA CG 5' |
| NO: 4 | Surface binder | 5' CGATTCCAGAACGTGACTGCTTTTT 3'-biotin |

Results DNA Sandwich and Competition Assays

The data for the biosensor device A show that the diffusion coefficient histograms and the measured state lifetimes depend on analyte concentration provided into the flow cell. State lifetimes could be extracted because reversible switches were observed between associated and dissociated states. State lifetimes show short-lived and long-lived states, which can be attributed to interactions of different types, e.g. different valencies.

The examples for the biosensor device B are shown of measured diffusion coefficient histograms as a function of the analyte concentration provided into the flow cell; motion traces at 10 µM concentration (free, single-bond, and multiple bond states are visible); and motion traces at 50 µM concentration (single-bond and multiple-bond states are visible).

Insights Provided by the Biosensors of the Invention

The data of the experiments show that:

particle tracking is possible with sufficient precision over a sufficiently long period of time, with clear detection of associated and dissociated states of the particles of the biosensor device;

statistical analysis of the associated and non-associated state lifetime distributions show dependencies on target concentration with high sensitivity (picomolar range); and the distributions of associated and non-associated state lifetimes exhibit multiple characteristic lifetimes (see: the multi-exponential fits) and corresponding population fractions, relating to transitions between different states (e.g. unbound states, states with monovalent bonds, states with multivalent bonds), all exhibiting target concentration dependencies.

Due to the observation of different states (unbound, monovalent bonds, multivalent bonds, etc.), different transition rates and state lifetimes can be measured, which depend on the captured amount of target on the particle and on the surface, and therefore depend on the concentration of target in solution. For example, when a particle is observed in a monovalent bond state or with a single-molecular bond, an additional bond can be formed. This gives lifetimes and transition rates corresponding to the formation of the first and the additional bond, which depend on the concentration, but in a different magnitude. This results in multiple parameters that can be extracted and used to improve the biosensing performance.

Important biosensing performance aspects of a biosensor are e.g. sensitivity, specificity, speed, reversibility, precision, accuracy, dynamic range, robustness, stability, multiplexing.

Furthermore, the measured lifetimes related to the different states (e.g. single and multiple bond states) give information about affinity of the molecules, e.g. association rate, dissociation rate, and equilibrium binding constant, which can be used to characterize the properties of the molecules.

Furthermore, after filling of a flow cell and starting the measurement, it was observed in the measurements that the fluid can be replaced in the flow cell with minimal disturbance of the particles. Therefore, a particle mobility assay without a fixed tether can be used for continuous biomarker monitoring. Due to reversible interactions, increases as well as decreases of analyte concentration can be followed.

Furthermore, changing the direction of flow in the flow cell can help to compensate displacements and minimize net distances that particles are displaced, which minimizes loss of particles and enables long measurement sequences and measurements over long timespans.

Concerning the distance between particle and surface in the unbound state, the preferred distance is in the range between 5 nm and 10 μm. The lower limit (5 nm) is determined by the fact that molecules and reversible biomolecular interactions are used, which operate typically on the length scale of a few nanometres; sufficient space is needed between particle and surface to be able to achieve an unbound state. The upper limit (10 μm) is determined by the fact that a sufficiently high collision rate between particle and surface is needed to achieve an effective association rate, so that sufficient transitions can be observed from unbound to bound states.

Advantages of an assay without fixed tether (versus with a fixed tether):

- no tethering is required, so the chemistry and sensor fabrication involve fewer reagents and fewer processing steps;
- due to the absence of fixed tether, the sensor is not dependent on tether stability or influenced by tether degradation;
- due to the absence of fixed tether, there is a molecular component less, so there are less physicochemical restrictions and a larger physicochemical and (bio)chemical window of operation, e.g. potentially a wider variety of buffers can be used, potentially a wider temperature range can be applied, etc.;
- the sensor without fixed tether is easier to prepare, so assay development, screening of reaction and preparation conditions, and technology development can go faster. Subsequently, the gained technological knowledge can also be applied for developing sensors with a fixed tether;
- less particles are needed for preparation of the sensor, because the tethering process typically has a low efficiency;
- the particle has freedom of rotational diffusion, so that interactions can occur on all sides of the particle (with fixed tether, the interaction area is restricted to the area around the tether attachment point); this can improve kinetics and sensitivity; furthermore, this can reduce variabilities and increase precision due to a larger interaction area per particle (lower sensitivity to physical and chemical heterogeneities on the particle);
- the particle has freedom of translational diffusion, so association can be detected over a large surface area (with fixed tether, the interaction area is restricted to the area around the tether attachment point); this can improve kinetics and sensitivity; and can reduce variabilities.
- the distance between particle and surface can be tuned over a large range; so that also large analytes can be measured, e.g. nanoparticles, extracellular vesicles, exosomes, nanosomes, liposomes, viral particles, cells, cell fragments, supramolecular objects, protein aggregates (a fixed short tether can sterically hinder the capture of large analytes between particle and surface);
- the non-associated state can easily be detected due to large displacements of the particle;
- the sensor can be prepared with particles in a dry state (e.g. in a dissolvable matrix) so that the sensor can be activated and directly used by adding fluid (this is more complicated in case of a fixed tether); and
- new particles can be added to the sensing chamber by supplying a solution with particles; this can improve e.g. the cartridge measurement lifetime (see below).

Other Aspects of the Invention

The biosensor of the present invention is a system that may contain multiple components, e.g. a component for sampling analyte from a system of interest (e.g. a biological system, an environmental system (e.g. river, pond, sea, lake, source), a channel, a pipe, a pool, a well, an exhaust, a process, a reactor, a fermenter, a flow, an organism, a reservoir, a patient, an animal, an organoid), for pre-treating the sample (e.g. dilution, filtration, heating, enzymatic processing, separation), for leading the sample to the sensing particles, for illuminating the particles, for collecting radiation from the particles, for imaging the particles, for determining spatial coordinate parameters of the particles at different time points, for determining displacements or translations or rotations or motion parameters of the particles, for determining states and binding and unbinding events in particle time traces, for processing histograms and distributions of parameters, for translating processed parameters (e.g. amplitude, state, diffusivity, diffusion constant, lifetime, rate, population in distributions, fractional occupation, switching activity, event frequency, time delay) into analytical parameters (e.g. concentration, precision, accuracy, time profile), for translating analytical parameters into control actions (e.g. warning signal or closed-loop control parameter), for controlling the different components in the system (e.g. a computer with software), or for communicating with an external component (e.g. larger control system, a database, an internet system, an information system, or a cloud system).

The biosensor of the present invention may contain a reader system (with e.g. an optical component, a component for data and signal processing, a component for interfacing and data communication), a fluidic system (with e.g. a method to bring fluid or particles into motion, a pump, a method to apply underpressure or overpressure, a method to effectuate dilution, a method to effectuate mixing, a vent, a tube, a valve, a filter, a switch, a flow sensor, a pressure sensor, a gas sensor, a gas handling method, a degassing unit, a flow regulator, a pressure regulator), or a cartridge or another container device (with e.g. an opening, a connector, an inlet, an outlet, a well, a channel, a measurement surface, a measurement chamber, an alignment mark, an identification mark, an ID tag). The system can have containers for reagents (e.g. buffer, particles, pre-treatment reagents) or for collection of fluids (e.g. a waste reservoir). The sensor system can contain wet reagents or dry reagents (e.g. dried-in or lyophilized).

In another aspect, several fluid transport or particle transport or molecular transport or analyte transport architectures can be used, e.g. in-plane transport, out-of-plane transport, cross-flow transport, convection, advection, diffusion. In another aspect of a sensor device, a sensor particle may be positioned near a first surface, with fluid transport or molecular transport or analyte transport in different directions with respect to the surface, e.g in a direction along the surface and/or a direction perpendicular to the surface; this includes transport through the surface. In another aspect, a particle may be positioned between a first surface and a second surface; the transport of fluid, molecules, or analyte may occur in different directions, e.g. along or through the different surfaces. Surfaces may be biofunctionalized in order to effectuate binding between particle and surface.

Cartridge and other components may be produced by patterning techniques (e.g., lithography, contact printing, microcontact printing, non-contact printing, self-assembly), additive manufacturing (e.g., 3D printing), joining (e.g., gluing, welding, adhesives, adhesive tape), assembly, lamination, automated placement, molding, over-molding, drop casting, curing (e.g., optical, thermal). Other possible manufacturing techniques are e.g. bio-patterning, bio-deposition, bio-conjugation, physisorption, drying, freeze drying, irradiation, sterilization, packaging, sealing.

Conditioning the sample or sample stream by chemical, biochemical, or physical means may improve the analytical performance of the sensor, e.g. by stabilizing the pH, the temperature, the mass density of the solution (which is e.g. relevant for $\Delta\rho$ in equation 3), the composition of the solution (e.g. absence of disturbing molecular or cellular aggregates), etc.

The particle detection and tracking can involve radiation, waves, electromagnetic principles, acoustics, scattering, fluorescence, absorbance, interference, plasmonic sensing, spectroscopic sensing, imaging, etc. The detection may allow reliable tracking of individual particles.

In another aspect, in case an optical detection method is used, the cartridge and optical components may contain optically transparent materials, e.g., glass or polymer.

In another aspect, the height tolerance of the method to track coordinate parameters (e.g. the focal depth in case of some optical tracking methods) is preferably compatible with the height fluctuations of the particles (see for example equation 2), so that a reliable tracking algorithm can be developed and so the probability to lose track of a particle due to height fluctuations is acceptable with respect to other sources of error.

For example, if the amount of time that a particle can be tracked is longer than the time needed to determine if a particle is in one state or in another state, then the state of the particle can be determined with precision and/or accuracy. For example, if the amount of time that a particle can be tracked is longer than the time needed to determine an effective spatial coordinate parameter or a motion parameter, then an effective spatial coordinate parameter or a motion parameter can be determined with precision and/or accuracy. For example, if a sufficiently high fraction of particles that interact with a surface are tracked, then a bound fraction, an unbound fraction, and/or a bound-to-unbound ratio can be determined with precision and/or accuracy. For example, if the amount of time that a particle can be tracked is longer than a characteristic state lifetime of a particle, then a characteristic state lifetime can be determined with precision and/or accuracy.

The biosensor of the present invention may be prepared for immediate use, or rapid use, or plug-and-play, e.g. by incorporating particles stored in a fluid, or particles stored inside a dissolvable matrix that is dispersed upon wetting and activated for sensing functionality in the measurement chamber.

The biosensor of the present invention may be used with a variety of binders, e.g. molecules, molecular constructs, and materials; e.g. with oligonucleotides, proteins, peptides, polymers, aptamers, small molecules, sugars, molecularly imprinted polymers, etc.

Association and dissociation state lifetimes in the system can be tuned by choice of e.g. binders, binder densities, blocking methods, buffer conditions, etc.

If the average tracking time of an individual particle is longer than the average association state lifetime and/or the average dissociation state lifetime of the particle, then multiple (un)binding events can be measured per particle. This is advantageous for the statistics and for the precision of derived parameters.

The biosensor of the present invention may comprise a component and method for dissociation or removal of particles from the sensor, e.g. by applying a fluid mechanical drag force (e.g. flow pulse), an interfacial tension (e.g. gas/liquid interface, gas bubble), a field force (e.g. magnetic field, acoustic force, optical field), a thermal excitation, or another directional or random force on particles or fluid. The biosensor of the present invention may also comprise a component or method for supply or addition of particles, e.g. by flowing a fluid containing dispersed particles into the measurement chamber, or by another force on particles or fluid. Removing and/or adding can be helpful for optimizing the sensor, or for resetting, regenerating, restarting, or refreshing the sensor.

Removing particles can be helpful when particles are no longer suited for sensing, e.g. have become inactive, non-responsive, static, or saturated. Adding or replacing particles can be helpful to supply particles with good sensing properties, or with different sensing properties, e.g. for sequentially measuring different analytes, or for sequentially sensing the same analyte at different time points (particularly relevant if relaxation times are long), or for sensing the same analyte with particles having different response properties (e.g. different sensitivity or specificity).

The biosensor of the present invention may have mixed sensing particles, e.g. particles with a fixed tether and particles without a fixed tether, or particles with different optical and/or sensing properties (e.g. for multiplexing).

The biosensor of the present invention may be used to measure affinity parameters and distributions of affinity parameters, of molecules and/or of particle-surface combinations.

The biosensor of the present invention may be used for continuous monitoring, intermittent testing, as well as for end-point measurements, e.g. for use at a point-of-need or for use in a laboratory setting.

The biosensor of the present invention can be used for e.g. industrial process monitoring, life science applications, medical applications, fermentations, bioreactors, patient care, clinical trials, pharmaceutical applications, environmental monitoring, testing in field settings, monitoring in home settings, extra-terrestrial testing, air quality monitoring, vapour testing, breath fluid testing, water monitoring, chemical monitoring, closed loop control, real time monitoring, early warning systems, etc.

DESCRIPTION OF THE DRAWINGS

FIG. 2 shows a schematic view of a biosensor device of the present invention wherein sensing of the analyte of interest 5 is measured by using a sandwich assay, wherein the analyte of interest 5 is sandwiched (see.

FIG. 13A shows microparticles that are functionalized with particle-side binders. The particles diffuse in the vicinity of a substrate functionalized with substrate-side binders. The binders have a specific affinity to target molecules. Target-induced sandwich complexes are reversibly formed and cause the particle to switch between unbound and bound states. The particle exhibits free Brownian motion in the unbound state and confined Brownian motion in the bound state. The right panel of FIG. 13A shows a microscopy image of about 500 particles in a field of view of approximately 500 µm×500 µm. The inset shows the reconstructed in-plane trajectories of a subset of particles (n=about 25) tracked for 300 seconds. FIG. 13B shows the experimental data for a sandwich system with oligonucleotide binders and target. The left column of FIG. 13B shows trajectories of single particles in absence (top) and presence (bottom) of target molecules in solution. The black spots in the bottom panel indicate bound states caused by target-induced sandwich bonds. The right column of FIG. 13B shows the diffusion parameter D calculated as a function of time based on the in-plane displacements derived from the particle trajectories. In the absence of analyte (top) the particles typically exhibit free Brownian motion. In the presence of analyte (bottom) particles show transitions from unbound (gray) to bound (black) states. Attributed state transitions are indicated by binary step functions (line at top). FIG. 13C shows the distributions of measured D of about 500 particles showing unbound state (gray) and bound state (black) populations in dependence of the target concentration.

FIG. 14A shows the diffusion coefficient. FIG. 14D shows the values measured over a 5-minute period showing unbound states (gray) and bound states (black). FIG. 14B shows the distributions of D derived from the single-particle traces in panel A, illustrating the difference between 1 and 2.8 µm particles. FIG. 14C shows the D distributions for hundreds of particles. FIG. 14D shows the distribution of unbound state lifetimes plotted as survival curves, for 1 µm and 2.8 µm particles with similar biofunctionalization and target concentration. Larger particles show shorter unbound state lifetimes than smaller particles in comparable conditions. The inset shows the same data on lin-lin scales. FIG. 14E shows the survival plot as in panel D, here for bound state lifetimes. Curve segments are attributed to short-lived monovalent bonds and longer-lived multivalent bonds.

FIG. 15A shows the survival curves of the characteristic unbound state lifetimes showing a dependency on the target concentration. With increasing DNA sandwich target concentration, the survival curves become steeper (black arrow), reflecting shorter times between binding events. FIG. 15B shows characteristic unbound state lifetimes (circles) dependent on the target concentration in a range of 30-500 pM, and the dashed line scales as about $[T]^{-1.6\pm0.1}$. The characteristic bound state lifetimes (triangles) are independent of the target concentration, with an average of 13±2 seconds (dashed line). Lifetimes of the blank and 15 pM target samples are not reported because the fitted lifetimes are much longer than the measurement time due to low background. Error bars are the standard deviations of the lifetime fits and are typically smaller than the symbol size. The inset shows the Neutravidin substrate functionalized with ssDNA binders, combined with 2.8 µm particles functionalized with different ssDNA binders. The ssDNA target strand is also depicted. FIG. 15C shows the dose-response curve expressed as the activity fitted with a Hill equation and the EC50 is 65±4 pM. The inset shows the response in the bound fraction, with an EC50 of 240±40 pM. Dashed lines indicate the 95% confidence interval of the Hill equation fit. FIG. 15D demonstrates the continuous monitoring of various target concentrations and reversibility of the sensor (fitted with exponential decay function, solid line). The bottom panel of FIG. 15D shows sandwich target concentrations applied over time in a stepwise fashion, followed by washing with buffer. The top panel of FIG. 15D shows the switching activity measured over time increases with increasing target concentrations, and reversibility is demonstrated within 90 minutes. Sensor functionality is retained after the washing steps with buffer.

FIG. 16A shows sensor response curves, i.e., the bound fraction and the switching activity as a function of target concentration, fitted with a Hill equation. The black and gray curves represent two consecutively measured dose-response curves with decreasing concentration series, which demonstrates the reversibility of the sensor and its suitability for monitoring applications. FIG. 16B shows characteristic unbound state lifetimes dependent on the target concentration in a range of 10 to 2000 nM. FIG. 16C shows the switching activity measured for the ssDNA target in 50 kDa spin-filtered bovine blood plasma. FIG. 16D shows characteristic unbound and bound state lifetimes measured in filtered bovine blood plasma.

FURTHER INFORMATION

Figure 1:
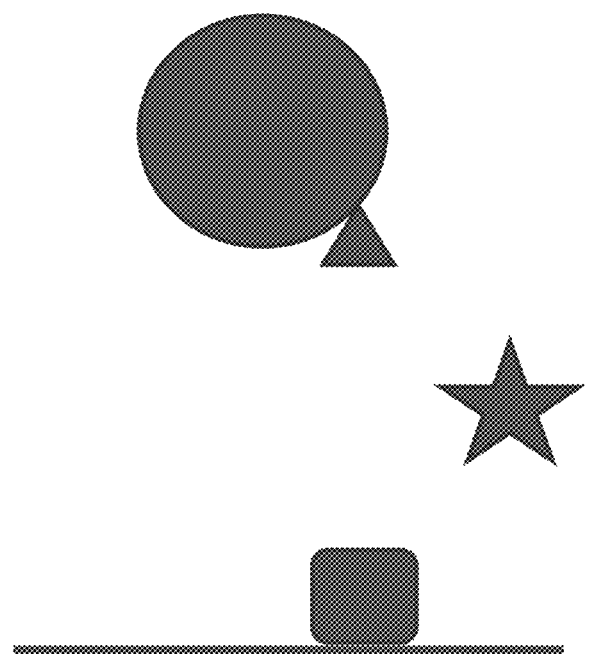
FIG. 1 shows a schematic view of a biosensor device of the present invention wherein both the particle 1 and the surface 2 are functionalized by a first moiety 3 and a second moiety 4. The analyte of interest 5 is visualized in FIG. 1 as well. The biosensor device as depicted in FIG. 1 is in its second, dissociated state: the functionalized particle 1 is not associated with the functionalized surface 2.
Figures 2A, 2B:
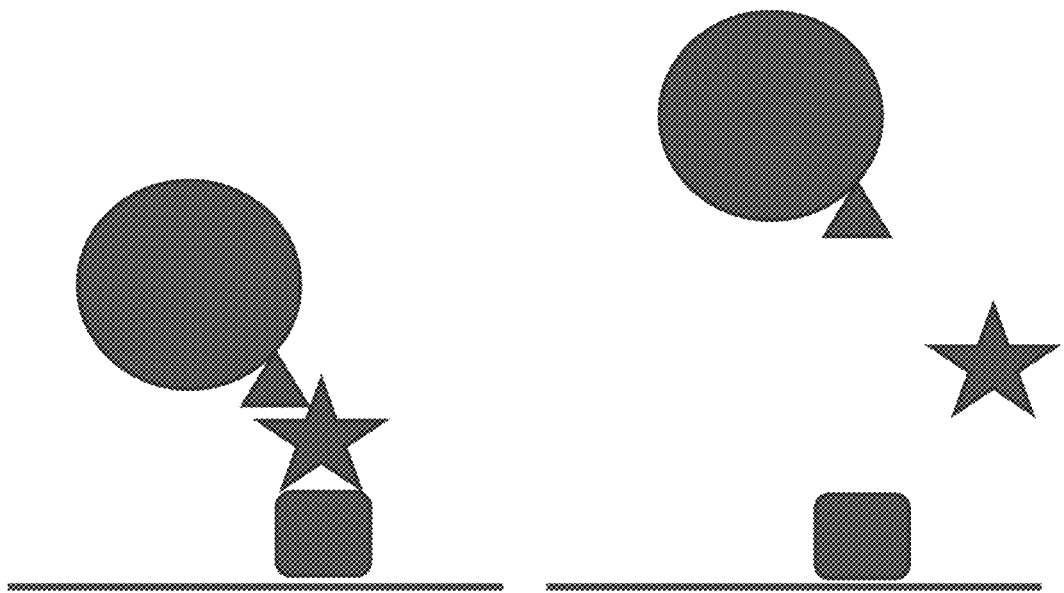
FIG. 2A) between the first moiety 3 of the particle 1 and the second moiety 4 of the surface 2 bringing the particle 1 in association with the surface 2 (i.e. the first state of the invention).
FIG. 2B shows a schematic view of the biosensor device wherein the analyte 5 is not sensed by the biosensor.
Figures 3A, 3B:
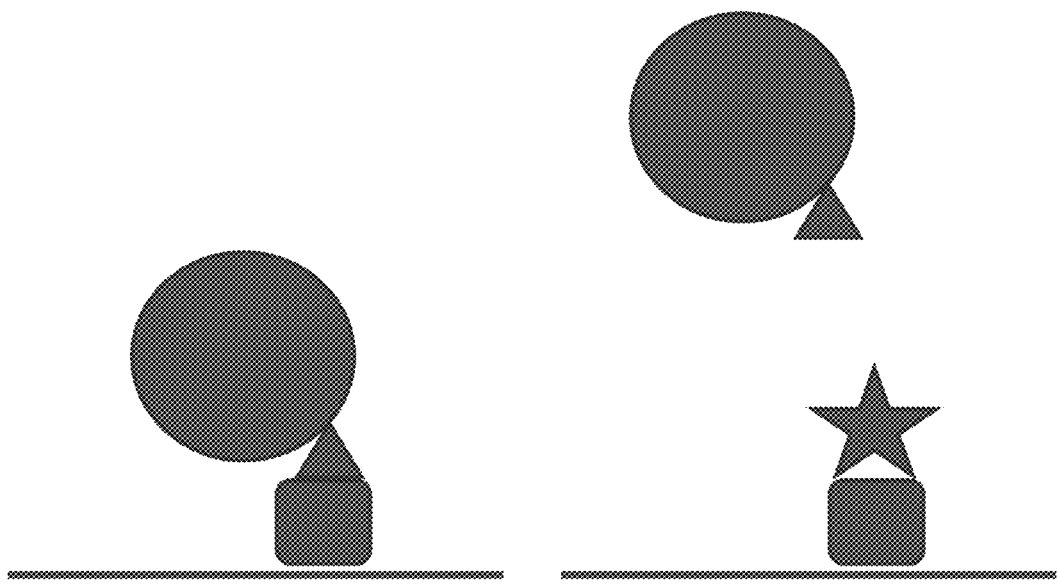
FIG. 3 shows a schematic view of a biosensor device of the present invention wherein sensing of the analyte of interest 5 is measured by using a competition assay, wherein either the first moiety 3 of the particle 1 binds to the second moiety 4 of the surface 2 (FIG. 3A) or the analyte of interest 5 binds to the moiety 4 of the surface 2 (FIG. 3B).
Figure 4:
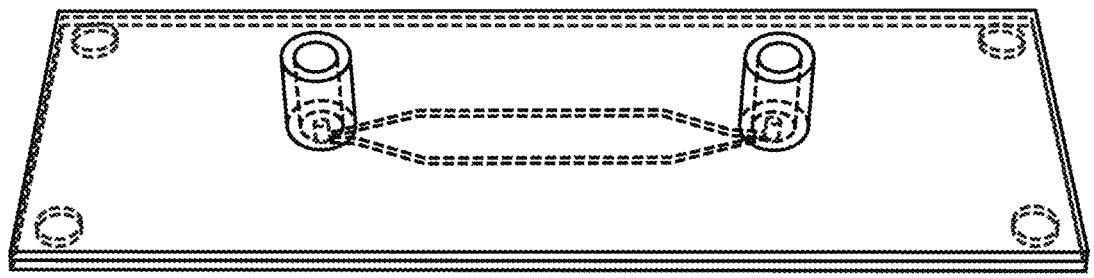
FIG. 4 shows an example of a flow cell cartridge suitable for use as the biosensor device of the present invention. The flow cell cartridge comprises an inlet 10, flow channels 11 and an outlet 12.
Figure 5:
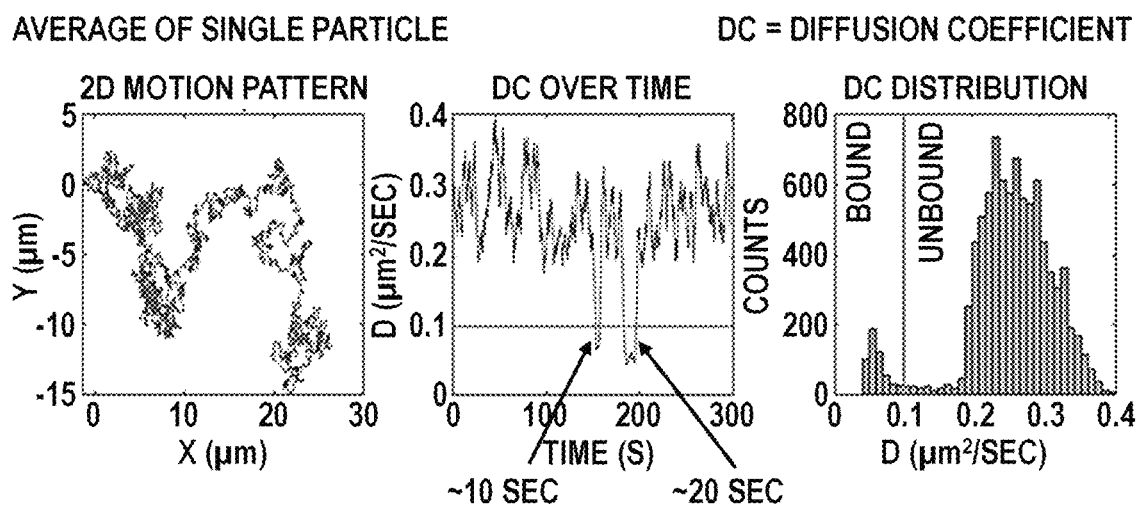
FIG. 5 shows the results of a measurement of a particle with 1 μm diameter, in an oligonucleotide-based sandwich assay at an ssDNA target concentration of 125 μM. The panel on the left of FIG. 5 shows a 2D motion pattern reconstructed from the xy-trajectory data. The panel in the middle of FIG. 5 shows a diffusion coefficient over time, showing free Brownian motion and two instances of confined Brownian motion caused by target-induced sandwich formation between the particle and the substrate. A threshold is set at $D=0.1$ $\mu m^2/s$ to distinguish the unbound state (wherein the particle is not associated with the surface) and the bound state (wherein the particle is associated with the surface). The panel on the right of FIG. 5 shows a histogram of calculated diffusion coefficient values showing a Gaussian-like distribution in the unbound state, and a peak below the threshold for the bound state. For this configuration (500 nM incubation concentration of substrate-side binder and 10 μM incubation concentration of particle-side binder) with 125 μM target, about 15% of all particles show single-molecule binding. At 250 μM target concentration this increases to about 30%. It is further noted that the measurements were started 2 minutes after addition of target (the analyte to be sensed by the biosensor).
Figure 6:
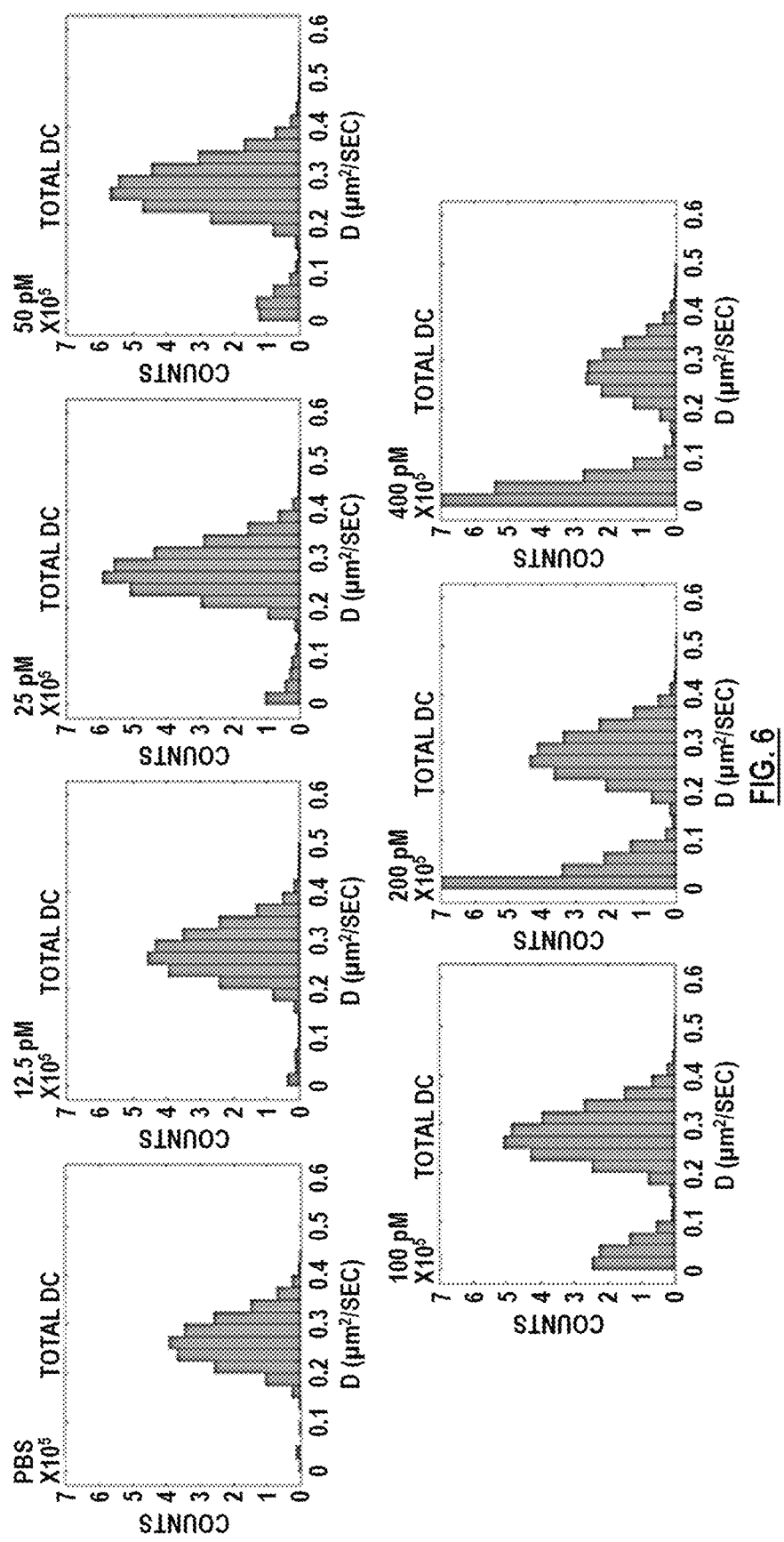
FIG. 6 shows various diffusion coefficient histograms of an oligonucleotide-based sandwich assay with 1 μm diameter particles. In buffer (PBS) a Gaussian-like curve is observed, with a mean D of about 0.25 $\mu m^2/s$. Upon addition of ssDNA target molecules, particles can bind to the substrate in a sandwich format, and therefore the diffusion coefficient decreases. This is reflected in the histograms by the appearance of a peak at $D<0.15$ $\mu mt/s$. The prominence of the peak increases with the target concentration.
Figure 7:
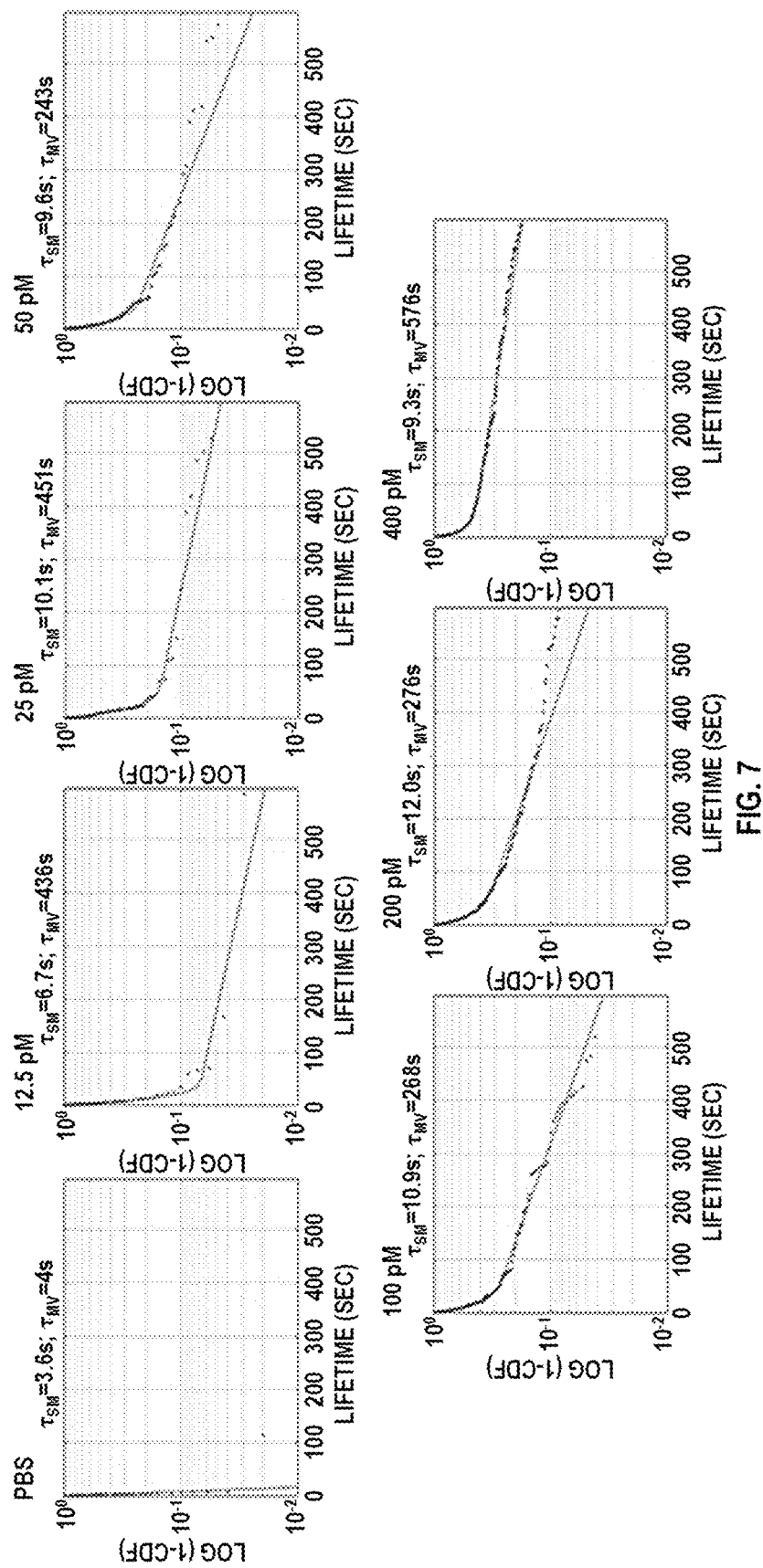
FIG. 7 shows bound state lifetime survival curves of the same experimental data as presented in FIG. 6. The graphs show the lifetimes (x-axis, lin scale) and their surviving fraction (y-axis, log scale) at different target concentrations. The cumulative distribution function (CDF) of all bound state lifetimes is determined, and the surviving fraction is defined as 1-CDF (dots in graphs). Characteristic bound state lifetimes are extracted based on double exponential fitting of the state lifetime survival curves (solid lines in the graphs). The first exponent represents short bound state lifetimes, which are attributed to the single-molecule binding mode ($\tau_{sm}$). This characteristic lifetime remains relatively constant upon addition of target, because the lifetime is dependent only on the affinity binder properties. The second exponent represents the longer-lived bound states, attributed to multivalent binding ($\tau_{mv}$). The fraction of multivalent binding as well as the characteristic lifetime observed in this experiment increases with increasing target concentration.
Figure 8:
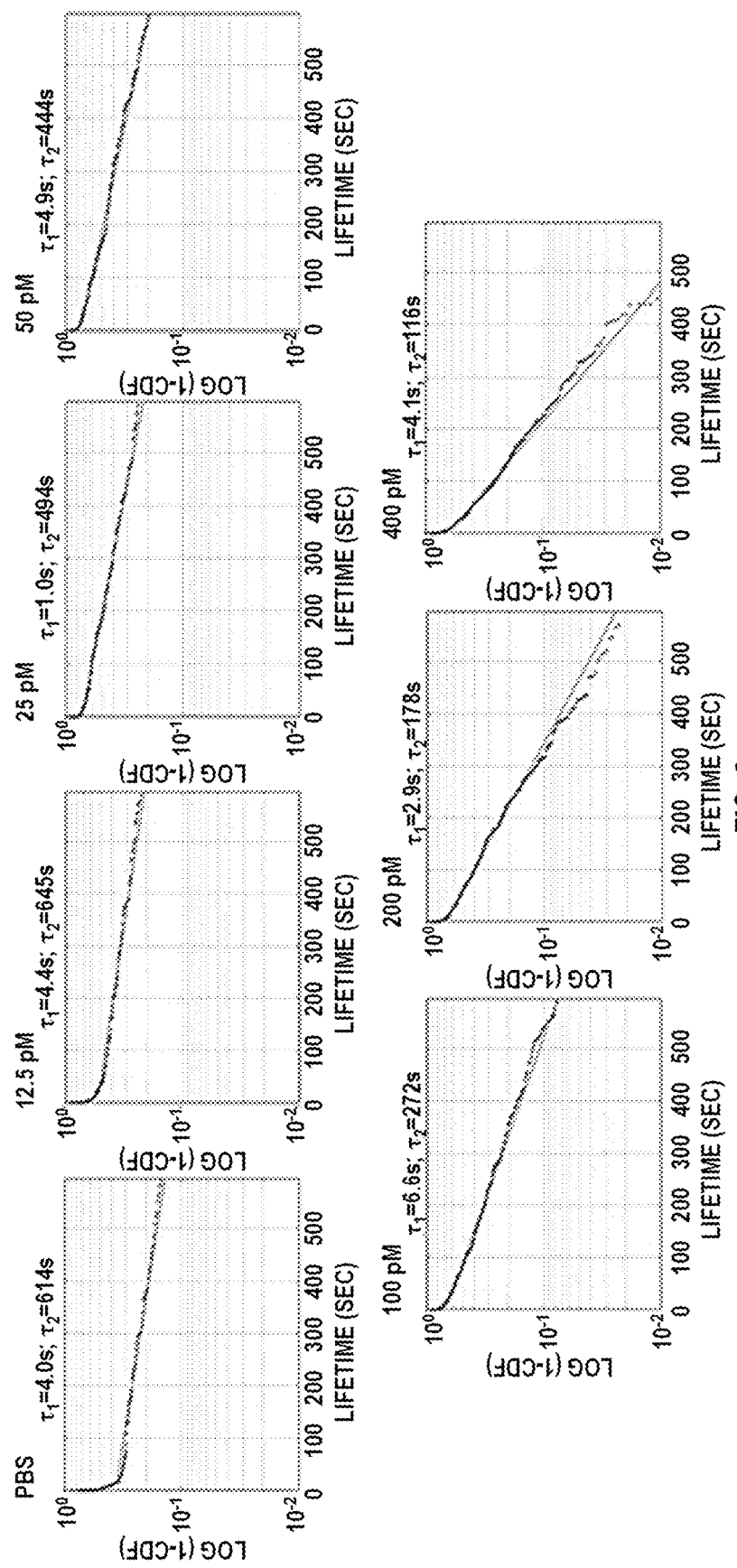
FIG. 8 shows unbound state lifetime survival curves of the same experimental data as presented in FIG. 6. The graphs show the lifetimes (x-axis, lin scale) and their surviving fraction (y-axis, log scale) at different target concentrations. Like the bound state lifetimes, the characteristic unbound state lifetimes are extracted based on double exponential fitting of the state lifetimes survival curves (solid lines in the graphs). The first exponent ($\tau_1$) represents short unbound state lifetimes (<10 s), which are attributed to non-specific interactions as well as measurement and analysis artefacts; these are independent of the target concentration. The second exponent ($\tau_2$) is attributed to molecular binding related unbound state lifetimes, which are inversely dependent on the target concentration. With increasing target concentration, the particles bind more often to the substrate and the time between binding events shortens. This is reflected in a decrease in the characteristic unbound state lifetime.
Figure 9:
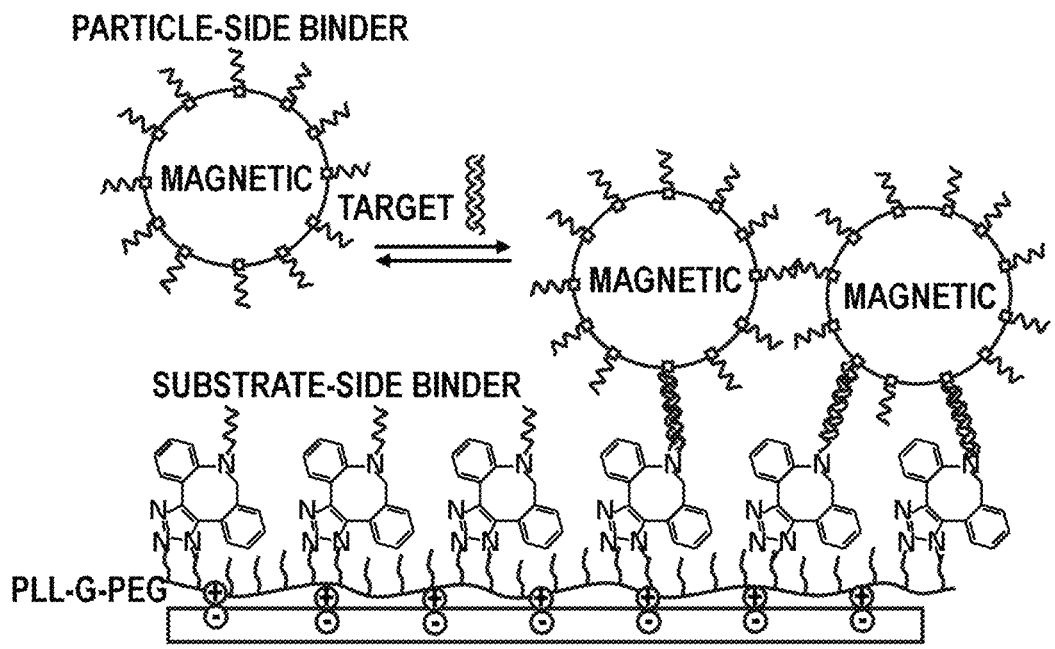
FIG. 9 shows a sketch of a ssDNA sandwich assay experiment with PLL-PEG functionalization. Particles were functionalized with particle-side binders having 11 bp complementary to the ssDNA target. The DBCO-tagged substrate-side binders were coupled to the physisorbed PLL-g-PEG polymer via the integrated azide groups, using second generation click chemistry. The reversible 9 bp hybridization between substrate-side binders and the ssDNA target results in transient binding of particles. In the presence of target, particles can bind to the surface due to the target-induced sandwich bond and can switch from unbound states (left) to single-bound or double-bound states (right).
Figure 10:
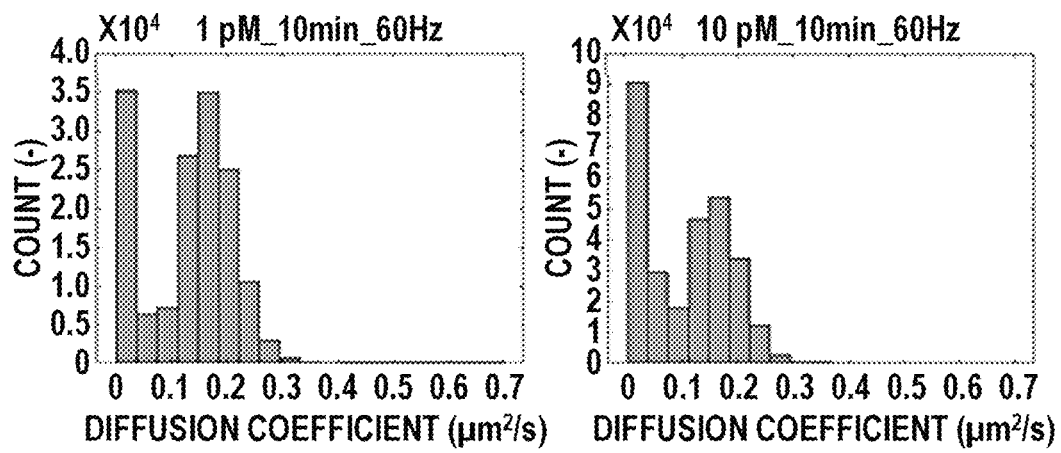
FIG. 10 shows the results of a single-stranded DNA target with a concentration of 1 pM, 10 pM and 100 pM added sequentially to the sensor to perform the DNA sandwich assay. The positions of particles were tracked over a duration of 10 minutes with a frame rate of 60 Hz. Diffusion coefficient histograms of an ensemble of particles were plotted for each concentration, showing unbound state and bound state populations in dependence of the target concentration.
Figure 10:
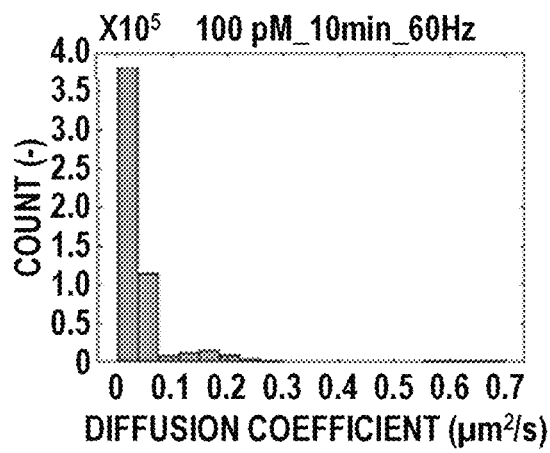
Figure 11:
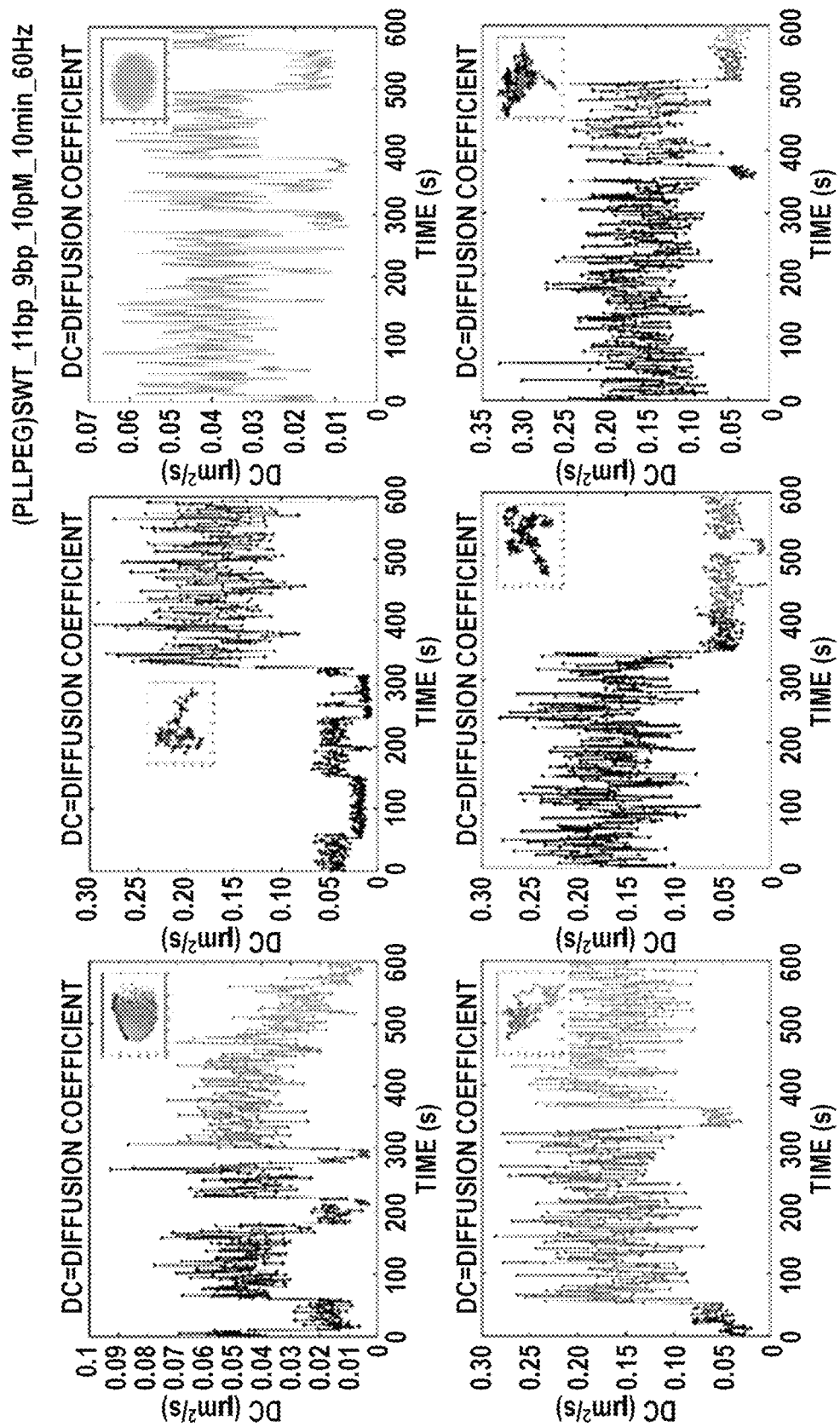
FIG. 11 shows examples of single particle trajectories and the corresponding evolution of diffusion coefficient. Single-stranded DNA target with a concentration of 10 pM was added to perform the DNA sandwich assay explained in FIG. 9. The positions of particles were tracked over a duration of 10 minutes and particle trajectories (inset graphs) can be reconstructed. The diffusion coefficient of every particle is calculated as a function of time and the binding/unbinding events are detected for all the particles in the field of view.
Figure 12:
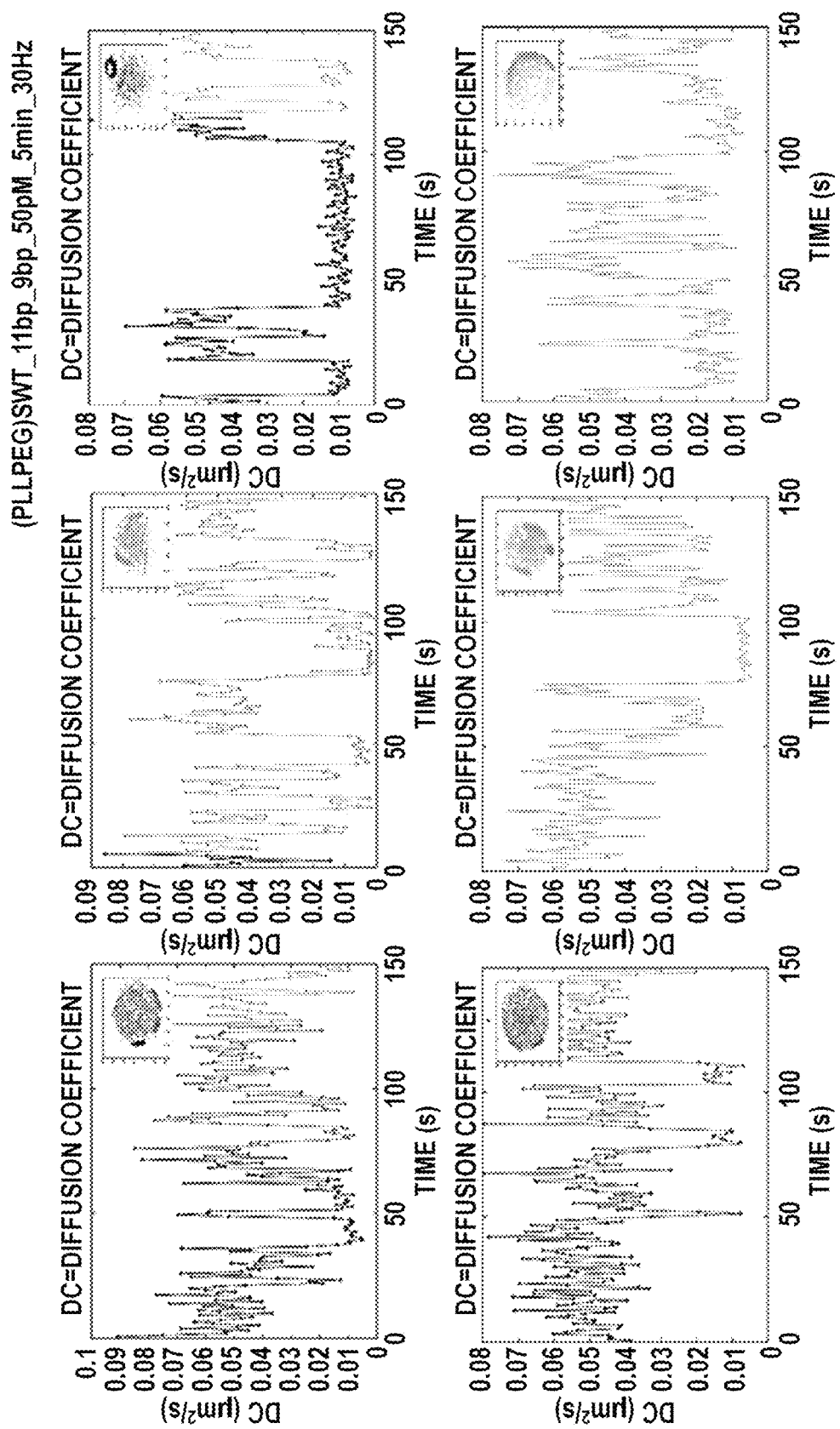
FIG. 12 shows examples of single particle trajectories and the corresponding evolution of diffusion coefficient. Single-stranded DNA target with a concentration of 50 pM was added to the system shown in FIG. 9, followed by a five-minute measurement. In these examples, particles mainly switched between single-bound states and double-bound states. Time traces with the two bound states are shown, corresponding to the timespan marked by different grayscale colours in the insets. Particles show pancake-like motion pattern at single bound state and stripe-like or dot-like motion patterns at double-bound states.
Figure 13:
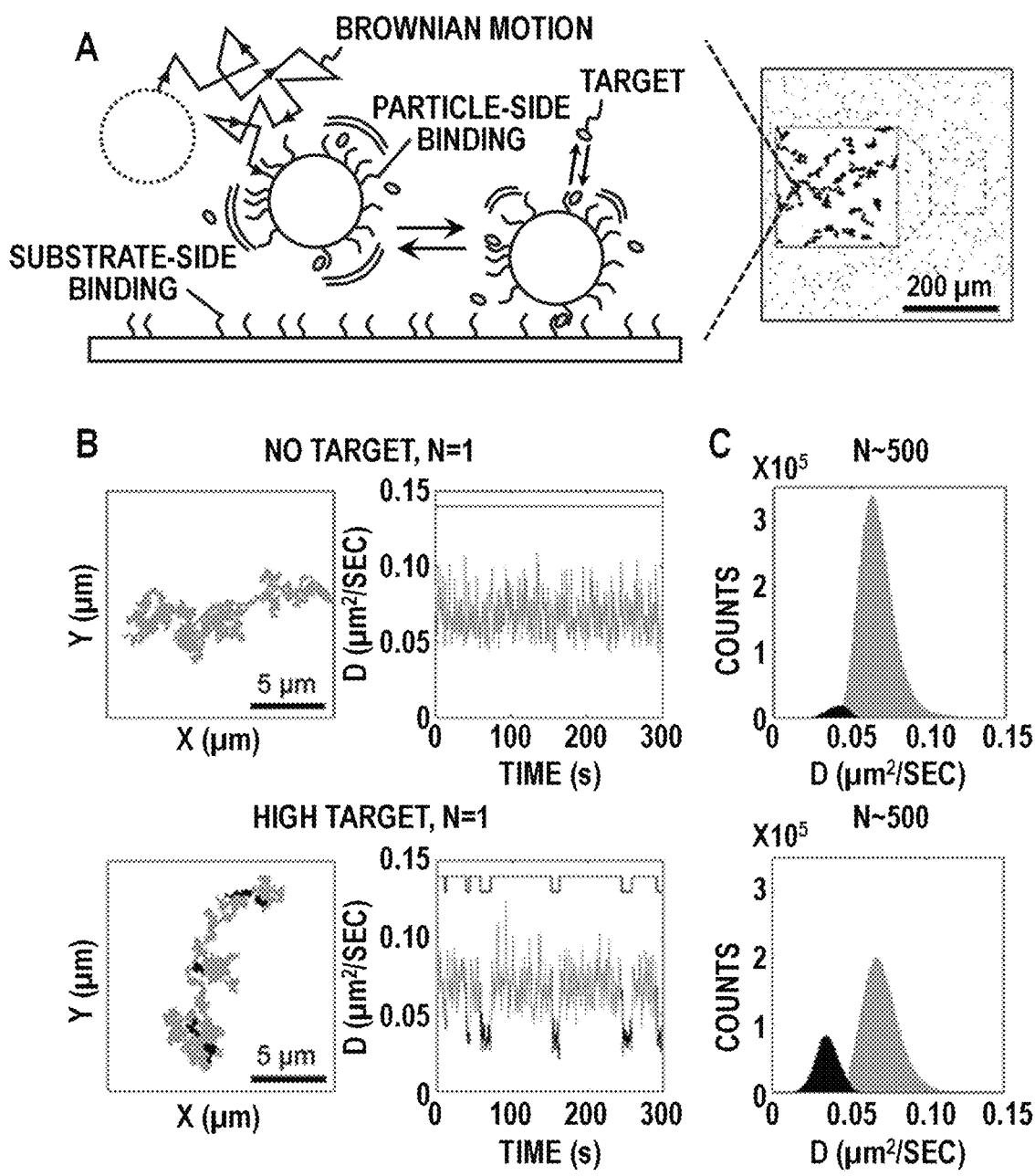
FIG. 13 shows the basic principle of the monitoring biosensor based on measuring free long-range diffusional motion of biofunctionalized particles having reversible molecular binding with a substrate.
Figure 14:
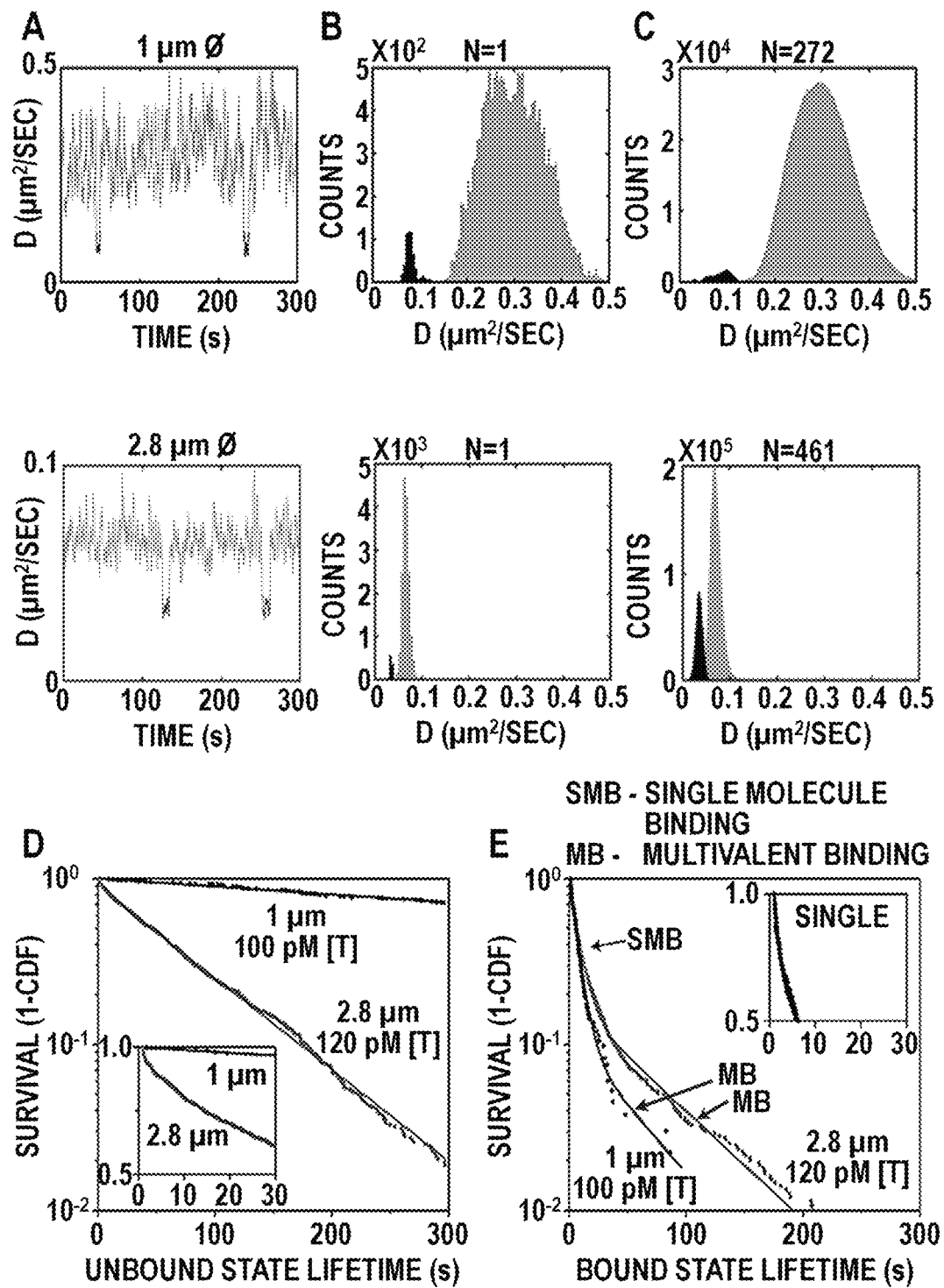
FIG. 14 shows the mobility time-traces and state lifetimes for particles with a diameter of 1 µm and 2.8 µm.
Figure 15:
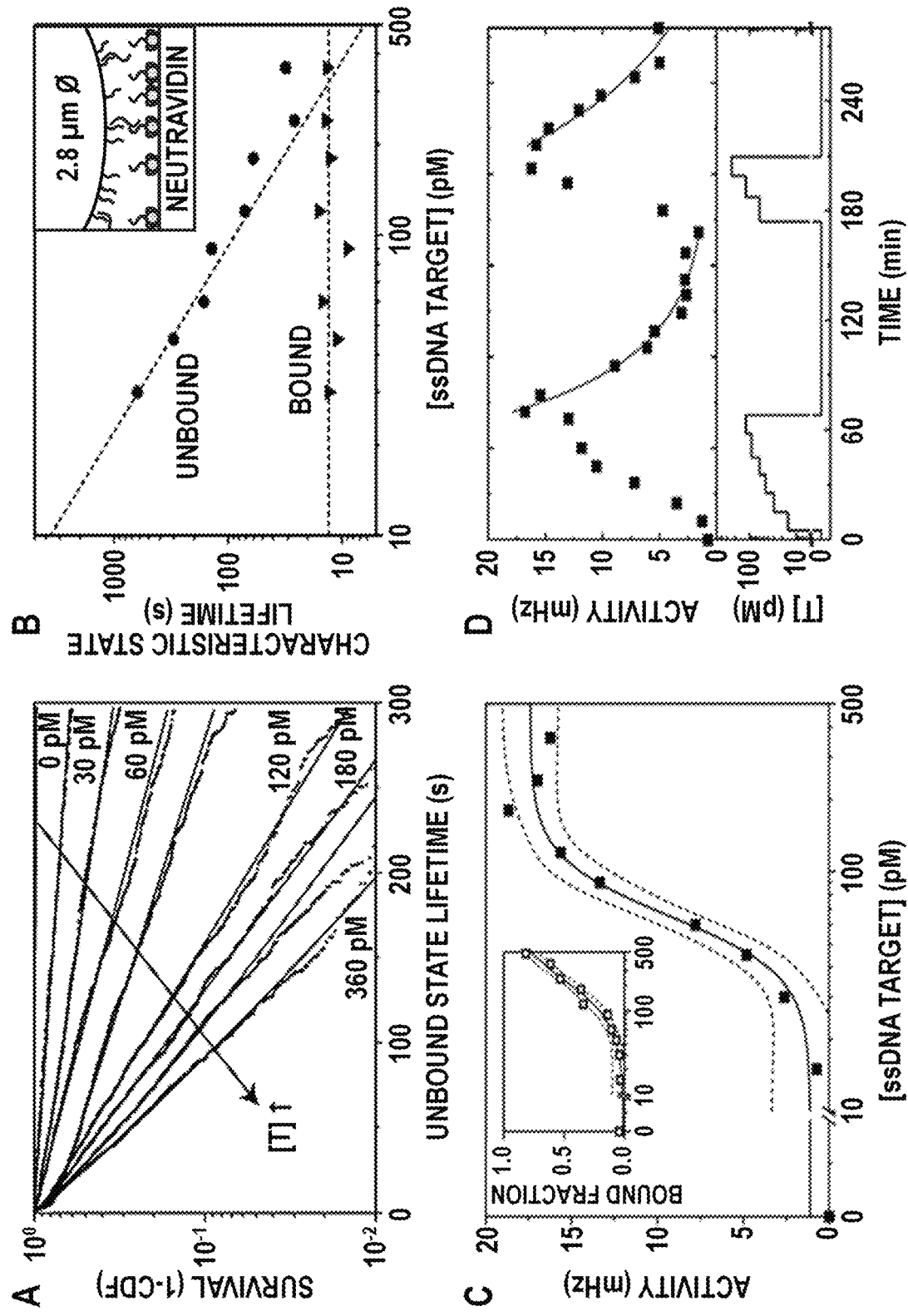
FIG. 15 shows a DNA-based sandwich assay using 2.8 µm particles.
Figure 16:
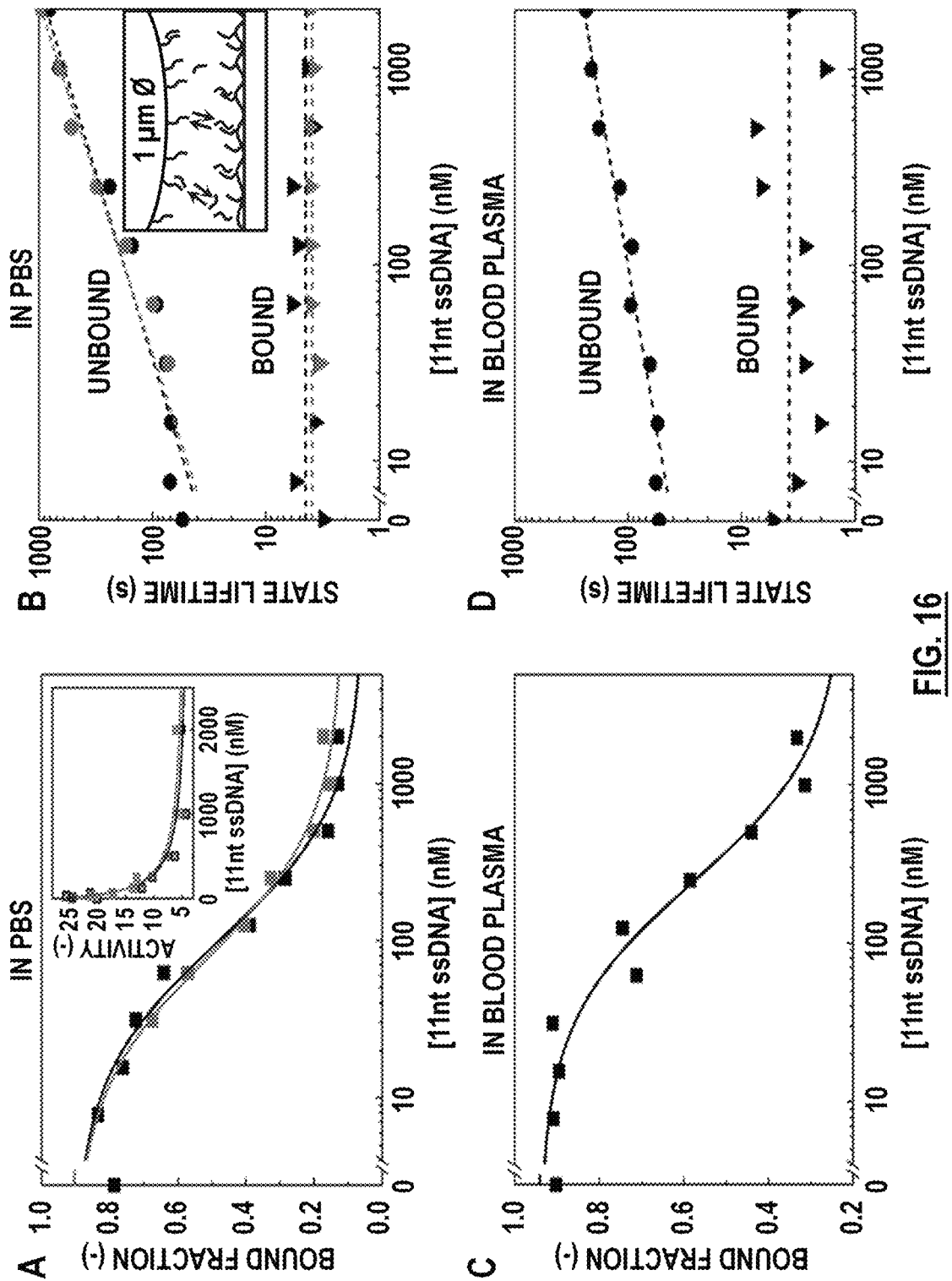
FIG. 16 shows the response to target concentration of a sensor with 1 µm particles, for a ssDNA competition assay in PBS and in filtered undiluted blood plasma. 1 µm particles were functionalized with particle-side binders via biotin-streptavidin interactions and DNA hybridization. The DBCO-tagged substrate-side binders were coupled to the PLL-g-PEG polymer via the integrated azide groups, using second generation click chemistry. The reversible 9 bp hybridization between substrate-side binders (which also functions as ssDNA analogues) and particle binders results in transient binding of particles. In the presence of the 11-nt target, the binding region on the particle-side binders is blocked, causing a decrease in bound fraction and a decrease in switching events.
Figure 17:
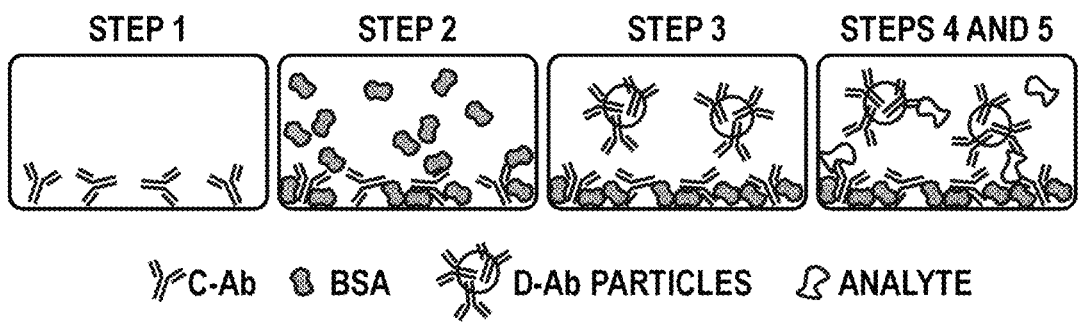
FIG. 17 shows a reversible sensor for the detection of sepsis biomarker procalcitonin (PCT) was demonstrated using an antibody sandwich immunoassay. Data are shown for two sensor devices. Glass substrates were functionalized with 100 nM capture antibody (c-Ab) through physisorption and subsequently blocked with 1% BSA in PBS (blocking buffer). Streptavidin coated 2.8 µm Dynabeads were functionalized with 100 nM biotinylated detection antibody (d-Ab), blocked with 100 µM biotinylated PEG (1 kDa) and blocked with blocking buffer. The d-Ab functionalized microparticles were diluted to 66 µg/mL in PBS with 0.1% BSA (assay buffer) and injected into the c-Ab functionalized sensor surface. Analyte PCT was spiked in assay buffer and 30 µL solution was injected into the sensor flow chamber. Each injection was carried out with flow reversal, i.e. alternating supply in inlet or outlet, to minimize the loss of particles at the sensor active field-of-view. Washing was carried out with assay buffer injection, identical to PCT measurement, for minimum of three washes to reach baseline bound particle fraction (open symbols). Particle motion was tracked for 10 minutes at 60 Hz under brightfield illumination. The data clearly shows the monitoring functionality of the sensor, i.e. a sensor response to PCT concentration and a reversibility of the sensor.
Figure 17:
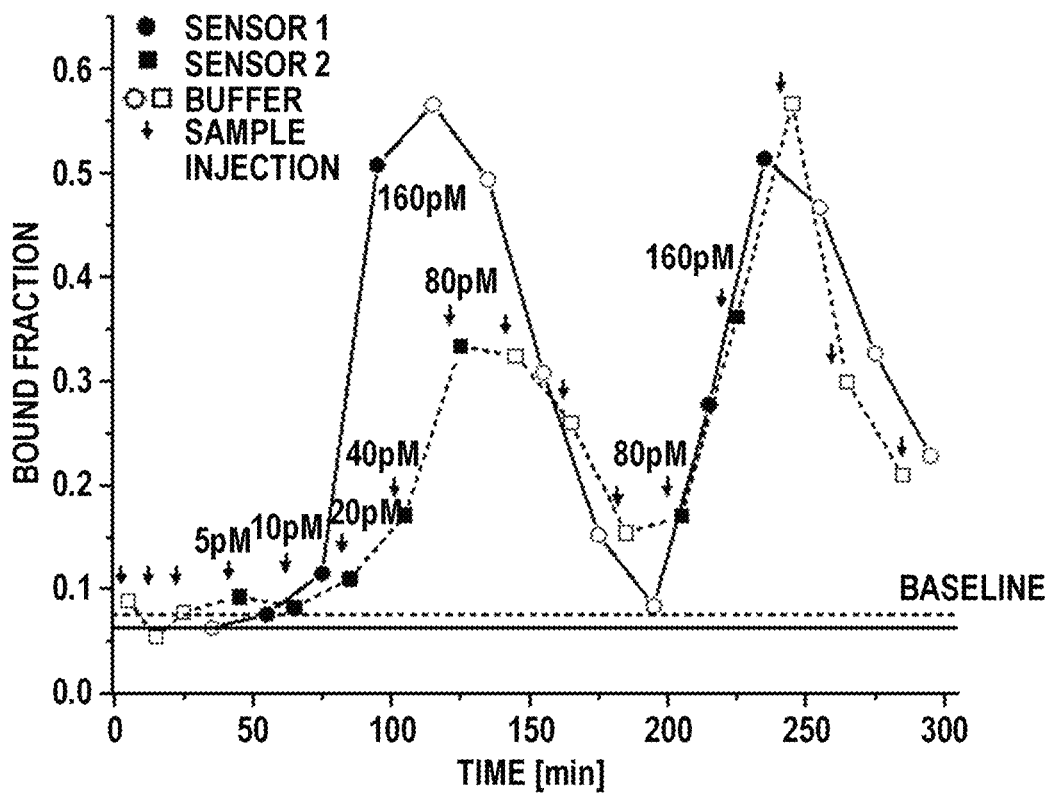

In further embodiments of the device or method of the present invention, the biosensor may not be in direct contact with a system of interest, or may be in direct contact with a system of interest. Alternatively, the biosensor may be embedded or integrated or implanted in a system of interest. The biosensor can be placed at a distance from the system of interest. However, the biosensor may be located near the system of interest, on the system, wirelessly integrated, or the like. Samples can be put in a container and then transported to the biosensing system (sometimes called at-line or off-line operation), samples can be taken and automatically transported to the biosensing system (sometimes called on-line operation), or the biosensing system can be fully integrated with the system of interest (sometimes called in-line operation or bypass operation).

In further embodiments of the present invention, the device or method may be connected to or integrated in an industrial system or process, a fermentor, a bioreactor, an on-body device, a catheter, an in-body device, a wearable device, or an insidable device.

In a biosensing system with monitoring functionality, time-dependent samples can be taken, measurement data may be recorded, and a time profile may be established of analyte concentration as a function of time. Also, a biosensor may be configured to receive a series of samples (from the same or from different sources) where the series of samples are serially measured on the biosensor and result in time-dependent data that relate to different samples that have been supplied to the biosensor.

In further embodiments of the present invention, the device or method may be combined with a method or device module for sample pre-treatment or analyte pre-treatment, e.g. reagent addition, dilution, filtration, extraction, enrichment, purification, separation, amplification, change of buffer condition, stabilization, (dis)aggregation, or removal, modification, or addition of a chemical group or a biochemical domain or residue or moiety.

In further embodiments of the present invention, the device or method may be combined with a method or device module for optimization or control of operation, e.g. temperature, humidity, pressure, light conditions, vibration conditions, sound conditions, sterility, hygiene, ingress protection, cleaning, parts replacement, easy maintenance, calibration, and the like.

The invention claimed is:

1. Biosensor device for sensing an analyte over a period of time using particle motion, the biosensor device having a surface and a particle, wherein the particle and/or the surface are functionalized, and wherein:
   the biosensor device has a first state in which the particle is associated ('is bound') with the surface and a second state in which the particle is not associated ('not bound') with the surface, and
   switching between the first and second states depends on the presence, absence and/or concentration of the analyte,
   whereby motion characteristics of the particle are changeable depending on the presence, absence and/or concentration of the analyte, thereby allowing sensing of the analyte by measuring changes in a spatial coordinate parameter of the particle relative to the surface,
   wherein the properties of the particle and surface are configured to be selected such that in the second state the particle is within the vicinity of the surface such that the biosensor is configured to measure changes in a spatial coordinate parameter of the particle relative to the surface, and
   wherein the particle is not conjugated to the surface.

2. Biosensor device according to claim 1, wherein the first state in which the particle is associated with the surface comprises a first association state and a second association state, wherein:
   the first association state includes a single-molecular bond between particle and surface; and
   the second association state includes two or more than two single-molecular bonds between particle and surface.

3. Biosensor device according to claim 1, wherein the biosensor device comprises at least 10 particles, more preferred at least 100 particles.

4. Biosensor device according to claim 1, wherein the biosensor device comprises a density between a few particles to several thousand particles in a 415×415 μm$^2$ region.

5. Biosensor device according to claim 1, wherein the biosensor device comprises an optical system having a diffraction limit, the biosensor device comprising particles separated from nearest-neighbour particles by at least the diffraction limit of the optical system.

6. Biosensor device according to claim 1, wherein the biosensor device implements a binding assay, a competitive assay, a displacement assay, a sandwich assay, an enzymatic assay, an assay with target and/or signal amplification, a multistep assay, or an assay with molecular cascade.

7. Biosensor device according to claim 1, wherein:
   the particle is functionalized by a first moiety, wherein the first moiety is bound to the particle; or
   the surface is functionalized by a second moiety, wherein the second moiety is bound to the surface,
   wherein the moieties have a binding affinity to the analyte.

8. Biosensor device according to claim 1, wherein:
   the particle is functionalized by a first moiety, wherein the first moiety is bound to the particle; and
   the surface is functionalized by a second moiety, wherein the second moiety is bound to the surface,
   wherein the moieties have a binding affinity to each other in dependence on the presence, absence or concentration of the analyte.

9. Biosensor device according to claim 7, wherein the dissociation rate constant of:
   the analyte and the first moiety in relation to the analyte and the second moiety, differ by at least a factor 3, preferably differ by at least a factor 5; or
   the first moiety and the second moiety in relation to the analyte and the first moiety, and/or in relation to the analyte and the second moiety, differ by at least a factor 3, preferably differ by at least a factor 5.

10. Biosensor device according to claim 7, wherein the biosensor device has a density of moieties in the range between $10^0$ and $10^8$ moieties/μm$^2$, preferably wherein the moieties bound to the particle or to the surface have a density in the range between $10^1$ and $10^7$ moieties/μm$^2$, $10^2$ and $10^6$ moieties/μm$^2$ or $10^3$ and $10^5$ moieties/μm$^2$.

11. Biosensor device according to claim 7, wherein the first moiety or the second moiety is a protein, an antibody, a fragment thereof, a recombinant protein, a peptide, a carbohydrate, a saccharide, a molecularly imprinted polymer, a small molecule, a nucleic acid, a DNA molecule, a PNA molecule, an aptamer, a nanobody, a multivalent binder, or a combination thereof, preferably wherein the first moiety or the second moiety is a binding molecule for glucose, electrolyte, metabolite, small molecule, lipid, carbohydrate, peptide, hormone, drug, drug metabolite, protein, oligonucleotide, DNA, RNA, nanoparticle, extracellular vesicle, exosome, nanosome, liposome, viral particle, cell, cell fragment, supramolecular object, or protein aggregate.

12. Use of the biosensor device according to claim 1 in a method of performing multiplexing, preferably analyte multiplexing, spatial multiplexing, spectroscopic multiplexing, probe functionality multiplexing.

13. Use of the biosensor device according to claim 1 as a sensor on or in or as part of a system for sensing or monitoring, which includes an endoscope, a tube, a needle, a fiber, a catheter, a patch, a disposable probe, a flow cell, or a disposable cartridge.

14. Biosensor device according to claim 1 for use in in vivo biosensing, ex vivo biosensing, or in vitro biosensing, such as in in vitro diagnostic testing, point-of-care testing, environmental testing, food testing, process monitoring, process control, forensics, biological, biomedical, and pharmaceutical research, or to monitor assays with live cells, tissue, or an organ.

15. Method for sensing an analyte using particle motion, the method comprising:
   a) contacting a matrix containing the analyte with the biosensor device according to claim 1; and
   b) detecting motion characteristics of the particle that change depending on a presence, absence and/or concentration of the analyte, wherein the motion characteristics comprise a spatial coordinate parameter of the particle relative to the surface.

16. Method according to claim 15, wherein the particle:
is arranged to switch from the first state to the second state with an average effective dissociation time; and
is arranged to switch from the second state to the first state with an average effective association time, and
wherein step b) of detecting motion characteristics of the particle is performed over a period of time that is longer than the average effective dissociation time and/or the average effective association time.

17. Method according to claim 15, wherein in step b) the direction of the flow of the matrix containing the analyte is continuously or intermittently changed.

18. Method according to claim 17, wherein the change of flow is subjected to a random flow directional change or to a reversal flow direction change.

19. Biosensor device according to claim 1, wherein a distance between the particle and the surface in the second state is within the range of 5 nm to 10 μm.

20. Biosensor device according to claim 1, wherein a distance between the particle and the surface in the second state is within the range of 5 nm to 10 μm.

* * * * *

SEQUENCE LISTING

```
<160> NUMBER OF SEQ ID NOS: 4

<210> SEQ ID NO 1
<211> LENGTH: 11
<212> TYPE: DNA
<213> ORGANISM: Artificial Sequence
<220> FEATURE:
<223> OTHER INFORMATION: Particle binder

<400> SEQUENCE: 1
agcatggcac t                                                          11

<210> SEQ ID NO 2
<211> LENGTH: 22
<212> TYPE: DNA
<213> ORGANISM: Artificial Sequence
<220> FEATURE:
<223> OTHER INFORMATION: Analyte

<400> SEQUENCE: 2
tcgtaccgtg agtaataatg cg                                              22

<210> SEQ ID NO 3
<211> LENGTH: 31
<212> TYPE: DNA
<213> ORGANISM: Artificial Sequence
<220> FEATURE:
<223> OTHER INFORMATION: Detecting

<400> SEQUENCE: 3
cattattaca agctaagctc ttgcactgac g                                    31

<210> SEQ ID NO 4
<211> LENGTH: 25
<212> TYPE: DNA
<213> ORGANISM: Artificial Sequence
<220> FEATURE:
```

```
<223> OTHER INFORMATION: Surface Binder

<400> SEQUENCE: 4
cgattccaga acgtgactgc ttttt                                                     25
```